United States Patent
Kim et al.

(10) Patent No.: US 12,118,068 B2
(45) Date of Patent: Oct. 15, 2024

(54) ELECTRONIC DEVICE AND METHOD OF PERFORMING AUTHENTICATION OPERATION BY ELECTRONIC DEVICE

(71) Applicant: Samsung Electronics Co., Ltd., Gyeonggi-do (KR)

(72) Inventors: Soyoung Kim, Gyeonggi-do (KR); Hyeonjeong Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 380 days.

(21) Appl. No.: 17/421,143

(22) PCT Filed: Jul. 2, 2021

(86) PCT No.: PCT/KR2021/008410
§ 371 (c)(1),
(2) Date: Jul. 7, 2021

(87) PCT Pub. No.: WO2022/010187
PCT Pub. Date: Jan. 13, 2022

(65) Prior Publication Data
US 2023/0146095 A1    May 11, 2023

(30) Foreign Application Priority Data
Jul. 7, 2020 (KR) ........................ 10-2020-0083202

(51) Int. Cl.
*G06F 21/32* (2013.01)
*G06F 9/451* (2018.01)

(52) U.S. Cl.
CPC .............. *G06F 21/32* (2013.01); *G06F 9/453* (2018.02)

(58) Field of Classification Search
CPC .......... G06F 21/32; G06F 9/453; G06F 21/46; G10L 15/04; G10L 15/22; G10L 17/24
See application file for complete search history.

(56) References Cited

U.S. PATENT DOCUMENTS

| 11,127,405 B1 * | 9/2021 | Antos | G10L 15/30 |
| 11,822,770 B1 * | 11/2023 | Antos | G10L 15/08 |

(Continued)

FOREIGN PATENT DOCUMENTS

| KR | 10-1425595 | 8/2014 |
| KR | 1020140141967 | 12/2014 |

(Continued)

OTHER PUBLICATIONS

International Search Report dated Oct. 19, 2021 issued in counterpart application No. PCT/KR2021/008410, 8 pages.

(Continued)

*Primary Examiner* — Beemnet W Dada
(74) *Attorney, Agent, or Firm* — The Farrell Law Firm, P.C.

(57) ABSTRACT

According to various embodiments, an electronic device comprising a memory; a communication module; and a processor, operatively connected to the memory and the communication module, and configured to, if a locked state of the electronic device and a first state of the electronic device are identified, when a first user utterance is acquired that requests a task executable in an unlocked state of the electronic device, change an unlocking type of the electronic device to an unlocking type of an external device, based on first information of the external device, the external device being communicatively connected to the electronic device through the communication module, unlock the electronic device, which is configured with the unlocking type of the external device, based on user authentication information acquired from the external device, and execute the task corresponding to the first user utterance. Various other embodiments may be provided. Meanwhile, a method of performing an authentication operation by the electronic (Continued)

device may be performed using an artificial intelligence model.

13 Claims, 17 Drawing Sheets

(56) References Cited

U.S. PATENT DOCUMENTS

| | | |
|---|---|---|
| 2014/0096179 A1 | 4/2014 | Ben-Shalom et al. |
| 2014/0359454 A1 | 12/2014 | Lee et al. |
| 2015/0058942 A1 | 2/2015 | Dermu et al. |
| 2015/0347010 A1 | 12/2015 | Yang et al. |
| 2015/0347738 A1 | 12/2015 | Ulrich et al. |
| 2017/0245145 A1 | 8/2017 | Choi et al. |
| 2018/0247065 A1* | 8/2018 | Rhee ................ G06F 21/32 |
| 2018/0260550 A1 | 9/2018 | Shin et al. |
| 2019/0230426 A1 | 7/2019 | Chun |
| 2020/0084626 A1 | 3/2020 | Brown et al. |

FOREIGN PATENT DOCUMENTS

| | | |
|---|---|---|
| KR | 10-2017-0058258 | 5/2017 |
| KR | 1020170098117 | 8/2017 |
| KR | 1020180099423 | 9/2018 |
| KR | 1020180103376 | 9/2018 |
| KR | 1020180135094 | 12/2018 |
| KR | 1020190064982 | 6/2019 |
| KR | 1020190089422 | 7/2019 |

OTHER PUBLICATIONS

Korean Office Action dated Aug. 15, 2024 issued in counterpart application No. 10-2020-0083202, 10 pages.

* cited by examiner

ELECTRONIC DEVICE AND METHOD OF PERFORMING AUTHENTICATION OPERATION BY ELECTRONIC DEVICE

PRIORITY

This application is a National Phase Entry of International Application No. PCT/KR2021/008410, which was filed on Jul. 2, 2021, and claims priority to Korean Patent Application No. 10-2020-0083202, filed in the Korean Intellectual Property Office on Jul. 7, 2020, the content of each of which is incorporated herein by reference.

TECHNICAL FIELD

According to various embodiments—relate generally to an electronic device and a method of performing an authentication operation, and more particularly, to a method of unlocking the electronic device through an external device when a task request is made in a locked state of the electronic device.

BACKGROUND ART

An electronic device is one necessary element to many people living in modern times. Consumers desire to receive various high quality services that they want anytime, anywhere through electronic devices.

A voice recognition service provides various content services to users in accordance with a user's voice received through a voice recognition interface implemented in electronic devices. In order to provide the voice recognition service, technologies for recognizing and analyzing human languages (for example, automatic voice recognition, natural language understanding, natural language generation, machine translation, a dialog system, question and answer, voice recognition, and/or voice synthesis) are implemented in the electronic devices.

Accordingly, a user of the electronic device may receive various content services in response to a user utterance through the voice recognition service implemented in the electronic device.

DETAILED DESCRIPTION OF THE INVENTION

Technical Problem

When an electronic device is in a locked state, there may be limitations on receiving a voice recognition service. When a user utterance making a request for a task related to personal information is received while the electronic device is in the locked state, the electronic device may make a request for unlocking the electronic device for security, and thus, a user of the electronic device may be inconvenienced by first having to unlock the electronic device through a physical contact, before receiving the voice recognition service.

More particularly, when the user inputs a user utterance for the voice recognition service through earphones worn by the user and connected to the electronic device, the user may be more inconvenienced when the electronic device is located in a bag or a pocket, or w % ben the user cannot physically contact the electronic device due to driving.

According to various embodiments relate to an electronic device and a method of performing an authentication operation by the electronic device that is capable of unlocking the electronic device using an external device when performance of a task is requested using a user utterance while in a locked state of the electronic device.

Technical Solution

According to various embodiments, an electronic device includes a memory, a communication module, and a processor, operatively connected to the memory and the communication module, and configured to, if a locked state of the electronic device and a first state of the electronic device are identified, when a first user utterance is acquired that requests a task executable in an unlocked state of the electronic device, change an unlocking type of the electronic device to an unlocking type of an external device, based on first information of the external device, the external device being communicatively connected to the electronic device through the communication module, unlock the electronic device, which is configured with the unlocking type of the external device, based on user authentication information acquired from the external device; and execute the task corresponding to the first user utterance.

According to various embodiments, the method includes an operation of acquiring a first user utterance that requests a task executable in an unlocked state of the electronic device; when a locked state of the electronic device and a first state of the electronic device are identified, changing an unlocking type configured in the electronic device to an unlocking type of an external device, based on first information of the external device, the external device being communicatively connected to the electronic device, unlocking the electronic device, which is configured with the second unlocking type, based on user authentication information acquired from the external device; and executing the task corresponding to the first user utterance.

Advantageous Effects

According to various embodiments, it is possible to provide convenience in that the user of the electronic device can execute a task corresponding to a user utterance after unlocking an electronic device without any physical contact to the electronic device by unlocking the electronic device using an external device connected to the electronic device.

BRIEF DESCRIPTION OF DRAWINGS

The above and other aspects, features, and advantages of the disclosure will be more apparent from the following detailed description when taken in conjunction with the accompanying drawings, in which.

MODE FOR CARRYING OUT THE INVENTION

Figure 1:
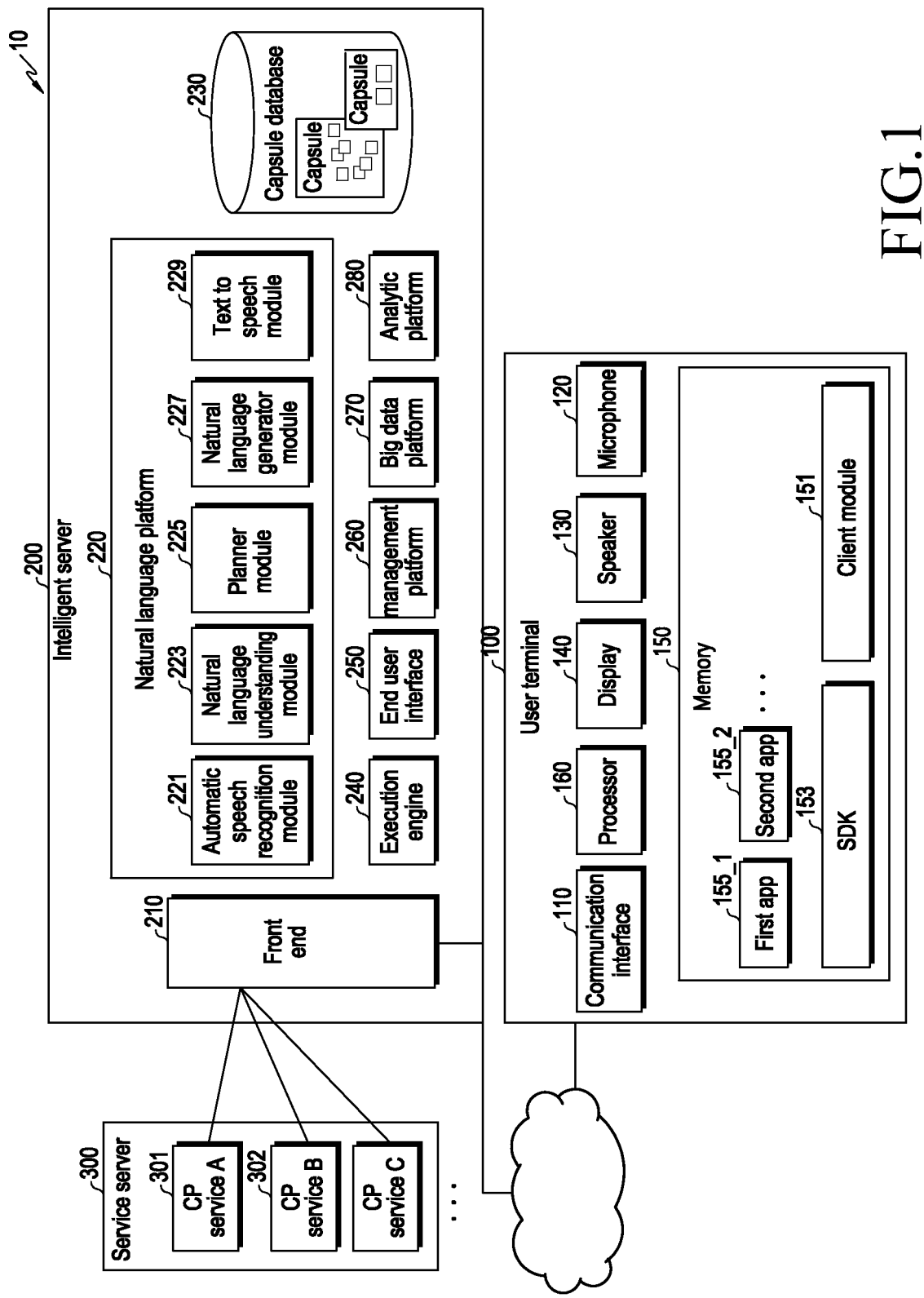
FIG. 1 is a block diagram illustrating an integrated intelligence system, according to an embodiment.

Embodiments of the disclosure are described in detail with reference to the accompanying drawings. The same or similar components are designated by the same or similar reference numerals although they are illustrated in different drawings. Detailed descriptions of constructions or processes known in the art may be omitted to avoid obscuring the subject matter of the disclosure.

According to various embodiments, a user of an electronic device can execute a task corresponding to a user utterance after unlocking the electronic device without any physical contact with the electronic device by unlocking the electronic device using an external device connected to the electronic device.

FIG. 1 is a block diagram illustrating an integrated intelligence system according to an embodiment.

Referring to FIG. 1, an integrated intelligence system 10 according to an embodiment may include a user terminal 100, an intelligent server 200, and a service server 300.

The user terminal 100 according to an embodiment may be a terminal device (or an electronic device) capable of being connected to the Internet, and may include, for example, a mobile phone, a smart phone, a personal digital assistant (PDA), a notebook computer, a TV, white goods, a wearable device, a head mounted device (HMD), or a smart speaker.

According to the embodiment, the user terminal 100 may include a communication interface 110, a microphone 120, a speaker 130, a display 140, a memory 150, or a processor 160. The listed elements may be operatively or electrically connected to each other.

The communication interface 110 according to an embodiment may be connected to an external device and configured to transmit and receive data. The microphone 120 according to an embodiment may receive a sound (for example, a user utterance) and convert the same into an electrical signal. The speaker 130 according to an embodiment may output the electrical signal in the form of a sound (for example, a voice). The display 140 according to an embodiment may be configured to display an image or a video. The display 140 according to an embodiment may display a graphic user interface (GUI) of an executed app (or application).

The memory 150 according to an embodiment may store a client module 151, a software development kit (SDK) 153, and a plurality of apps (for example, first app 155_1 and second app 155_2). The client module 151 and the SDK 153 may configure a framework (or a solution program) for performing a universal function. Further, the client module 151 or the SDK 153 may configure a framework for processing a voice input.

The plurality of apps may be programs for performing a predetermined function. According to an embodiment, each of the plurality of apps 155 may include a plurality of operations for performing predetermined functions. For example, the apps may include an alarm app, a message app, and/or a schedule app. According to an embodiment, the plurality of apps 155 may be executed by the processor 160 so as to sequentially perform at least some of the plurality of operations.

The processor 160 according to an embodiment may control the overall operation of the user terminal 100. For example, the processor 160 may be electrically connected to the communication interface 110, the microphone 120, the speaker 130, and the display 140 and may perform predetermined operations.

The processor 160 according to an embodiment may perform a predetermined function by executing a program stored in the memory 150. For example, the processor 160 may perform the following operation for processing a voice input by executing at least one of the client module 151 or the SDK 153. The processor 160 may control, for example, the operation of the plurality of apps through the SDK 153. The following operation which is the operation of the client module 151 or the SDK 153 may be performed by the processor 160.

The client module 151 according to an embodiment may receive a voice input. For example, the client module 151 may receive a voice signal corresponding to a user speech detected through the microphone 120. The client module 151 may transmit the received voice input to the intelligent server 200. The client module 151 may transmit state information of the user terminal 100 along with the received voice input to the intelligent server 200. The status information may be, for example, execution state information of the app.

The client module 151 according to an embodiment may receive a result corresponding to the received voice input. For example, if the intelligent server 200 obtains the result corresponding to the received voice input, the client module 151 may receive the result corresponding to the received voice input. The client module 151 may display the received result on the display 140.

The client module 151 according to an embodiment may receive a plan corresponding to the received voice input. The client module 151 may display the result obtained by performing the plurality of operations of the app on the display 140 according to the plan. The client module 151 may sequentially display, for example, the execution result of the plurality of operations on the display. In another example, the user terminal 100 may display results of only some of the plurality of operations (for example, the result of only the last operation) on the display.

According to an embodiment, the client module 151 may receive a request for acquiring information required for obtaining the result corresponding to the voice input from the intelligent server 200. According to an embodiment, the client module 151 may transmit the required information to the intelligent server 200 in response to the request.

The client module 151 according to an embodiment may transmit result information of the execution of the plurality of operations to the intelligent server 200 according to the plan. The intelligent server 200 may identify that the received voice input is correctly processed using the result information.

The client module 151 according to an embodiment may include a voice recognition module. According to an embodiment, the client module 151 may recognize a voice input for performing a limited function through the voice recognition module. For example, the client module 151 may perform an intelligent app for processing a voice input to perform an organic operation through a predetermined input (for example, wake up!).

The intelligent server 200 according to an embodiment may receive information related to a user voice input from the user terminal 100 through a communication network. According to an embodiment, the intelligent server 200 may change data related to the received voice input into text data. According to an embodiment, the intelligent server 200 may generate a plan for performing a task corresponding to the user voice input based on the text data.

According to an embodiment, the plan may be generated by an artificial intelligence (AI) system. The intelligence system may be a rule-based system or a neural network-based system (for example, a feedforward neural network (FNN)), or a recurrent neural network (RNN)). Alternatively, the intelligence system may be a combination thereof or an intelligent system different therefrom. According to an embodiment, the plan may be selected from a combination of predefined plans or generated in real time in response to a user request. For example, the intelligence system may select at least one plan among from a plurality of predefined plans.

The intelligent server 200 according to an embodiment may transmit the result of the generated plan to the user terminal 100 or transmit the generated plan to the user terminal 100. According to an embodiment, the user terminal 100 may display the result of the plan on the display. According to an embodiment, the user terminal 100 may display the result of execution of operation according to the plan on the display.

According to an embodiment, the intelligent server 200 may include a front end 210, a natural language platform 220, a capsule database (DB) 230, an execution engine 240, an end user interface 250, a management platform 260, big data platform 270, and an analytic platform 280.

According to an embodiment, the front end 210 may receive the received voice input from the user terminal 100. The front end 210 may transmit a response to the voice input.

According to an embodiment, the natural language platform 220 may include an automatic speech recognition (ASR) module 221, a natural language understanding (NLU) module 223, a planner module 225, a natural language generator (NLG) module 227, or a text to speech (TTS) module 229.

The automatic speech recognition module 221 according to an embodiment may convert the voice input received from the user terminal 100 into text data. The natural language understanding module 223 according to an embodiment may detect a user's intention on the basis of text data of the voice input. For example, the natural language understanding module 223 may detect a user's intention by performing syntactic analysis or semantic analysis. The natural language understanding module 223 according to an embodiment may detect a meaning of a word extracted from the voice input based on a linguistic characteristic of a morpheme or a phrase (for example, grammatical element) and match the detected meaning of the word and the intent so as to determine the user intent.

The planner module 225 according to an embodiment may generate a plan based on the intention determined by the natural language understanding module 223 and a parameter. According to an embodiment, the planner module 225 may determine a plurality of domains required for performing a task based on the determined intent. The planner module 225 may determine a plurality of operations included in the plurality of domains determined based on the intent. According to an embodiment, the planner module 225 may determine a parameter required for performing the plurality of determined operations or a result value output by the execution of the plurality of operations. The parameter and the result value may be defined by a concept of a predetermined type (or class). According to an embodiment, the plan may include a plurality of operations determined by the user intent and a plurality of concepts. The planner module 225 may gradually (or hierarchically) determine the relationship between the plurality of operations and the plurality of concepts. For example, the planner module 225 may determine the execution order of the plurality of operations determined on the basis of the user intent based on the plurality of concepts. In other words, the planner module 225 may determine the execution order of the plurality of operations based on the parameter required for performing the plurality of operations and the result output by the execution of the plurality of operations. Accordingly, the planner module 225 may generate a plan including information on the relationship (for example, ontology) between the plurality of operations and the plurality of concepts. The planner module 225 may generate a plan based on information stored in the capsule database 230 corresponding to a set of relationships between concepts and operations.

The natural language generator module 227 according to an embodiment may change predetermined information in the form of text. The information converted into the form of text may be the form of a natural language speech. The text to speech module 229 may convert information in the form of text into information in the form of voice.

According to an embodiment, some or all of the functions of the natural language platform 220 may be performed by the user terminal 100.

The capsule database 230 may store information on the relationship between a plurality of concepts and operations corresponding to a plurality of domains. The capsule according to an embodiment may include a plurality of operation objects (action objects or action information) and concept objects (or concept information) included in the plan. According to an embodiment, the capsule database 230 may store a plurality of capsules in the form of a concept action network (CAN). According to an embodiment, the plurality of capsules may be stored in a function registry included in the capsule DB 230.

The capsule database 230 may include a strategy registry storing strategy information that is required when a plan corresponding to a voice input is determined. When there area plurality of plans corresponding to the voice input, the strategy information may include reference information for determining one plan. According to an embodiment, the capsule database 230 may include a follow up registry storing the following operation to suggest the following operation to the user in a predetermined situation. The following operation may include, for example, the following speech. According to an embodiment, the capsule database 230 may include a layout registry storing layout information which is information output through the user terminal 100. According to an embodiment, the capsule database 230 may include a vocabulary registry storing vocabulary information included in the capsule information. According to an embodiment, the capsule database 230 may include a dialogue registry storing information on a dialogue (or an interaction) with the user. The capsule database 230 may update the stored object through a developer tool. The developer tool may include a function editor for updating, for example, the operation object or the concept object. The developer tool may include a vocabulary editor for updating a vocabulary. The developer tool may include a strategy editor for generating and registering a strategy to determine a plan. The developer tool may include a dialogue editor for generating a dialogue with the user. The developer tool may include a follow up editor for activating the following goal and editing the following speech that provides a hint. The follow-up goal may be determined based on the current goal, a user's preference, or an environment condition. According to an embodiment, the capsule database 230 may be implemented within the user terminal 100.

The execution engine 240 according to an embodiment may obtain the result based on the generated plan. The end user interface 250 may transmit the obtained result to the user terminal 100. Accordingly, the user terminal 100 may receive the result and provide the received result to the user. The management platform 260 according to an embodiment may manage information used by the intelligent server 200. The big data platform 270 according to an embodiment may collect user data. The analytic platform 280 according to an embodiment may manage quality of service (QoS) of the intelligent server 200. For example, the analytic platform 280 may manage elements and a processing speed (or efficiency) of the intelligent server 200.

The service server 300 according to an embodiment may provide a predetermined service (for example, a food order (CP service A 301) or a hotel reservation (CP service B 302)) to the user terminal 100. According to an embodiment, the service server 300 may be a server operated by a third party. The service server 300 according to an embodiment may provide information for generating a plan corresponding to the received voice input to the intelligent server 200. The provided information may be stored in the capsule database 230. Further, the service server 300 may provide result information of the plan to the intelligent server 200.

In the integrated intelligence system 10, the user terminal 100 may provide various intelligent services to the user in response to a user input. The user input may include, for example, an input through a physical button, a touch input, or a voice input.

According to an embodiment, the user terminal 100 may provide a voice recognition service through an intelligent app (or a voice recognition app) stored in the user terminal 220. In this case, for example, the user terminal 100 may recognize a user speech (utterance) or a voice input received through the microphone and provide a service corresponding to the recognized voice input to the user.

According to an embodiment, the user terminal 100 may perform a predetermined operation based on the received voice input along or together with the intelligent server and/or the service server. For example, the user terminal 100 may execute an app corresponding to the received voice input and perform a predetermined operation through the executed app.

According to an embodiment, when the user terminal 100 provides the service together with the intelligent server 200 and/or the service server, the user terminal may detect a user speech through the microphone 120 and generate a signal (or voice data) corresponding to the detected user speech. The user terminal may transmit the voice data to the intelligent server 200 through the communication interface 110.

The intelligent server 200 according to an embodiment may generate a plan for performing a task corresponding to the voice input or the result of the operation according to the plan in response to the voice input received from the user terminal 100. The plan may include, for example, a plurality of operations for performing a task corresponding to the voice input of the user and a plurality of concepts related to the plurality of operations. The concepts may be parameters input to execution of the plurality of operations or may be defined for result values output by the execution of the plurality of operations. The plan may include the relationship between the plurality of operations and the plurality of concepts.

The user terminal 100 according to an embodiment may receive the response through the communication interface 110. The user terminal 100 may output a voice signal generated within the user terminal 100 to the outside through the speaker 130 or output an image generated within the user terminal 100 to the outside through the display 140.

Figure 2:
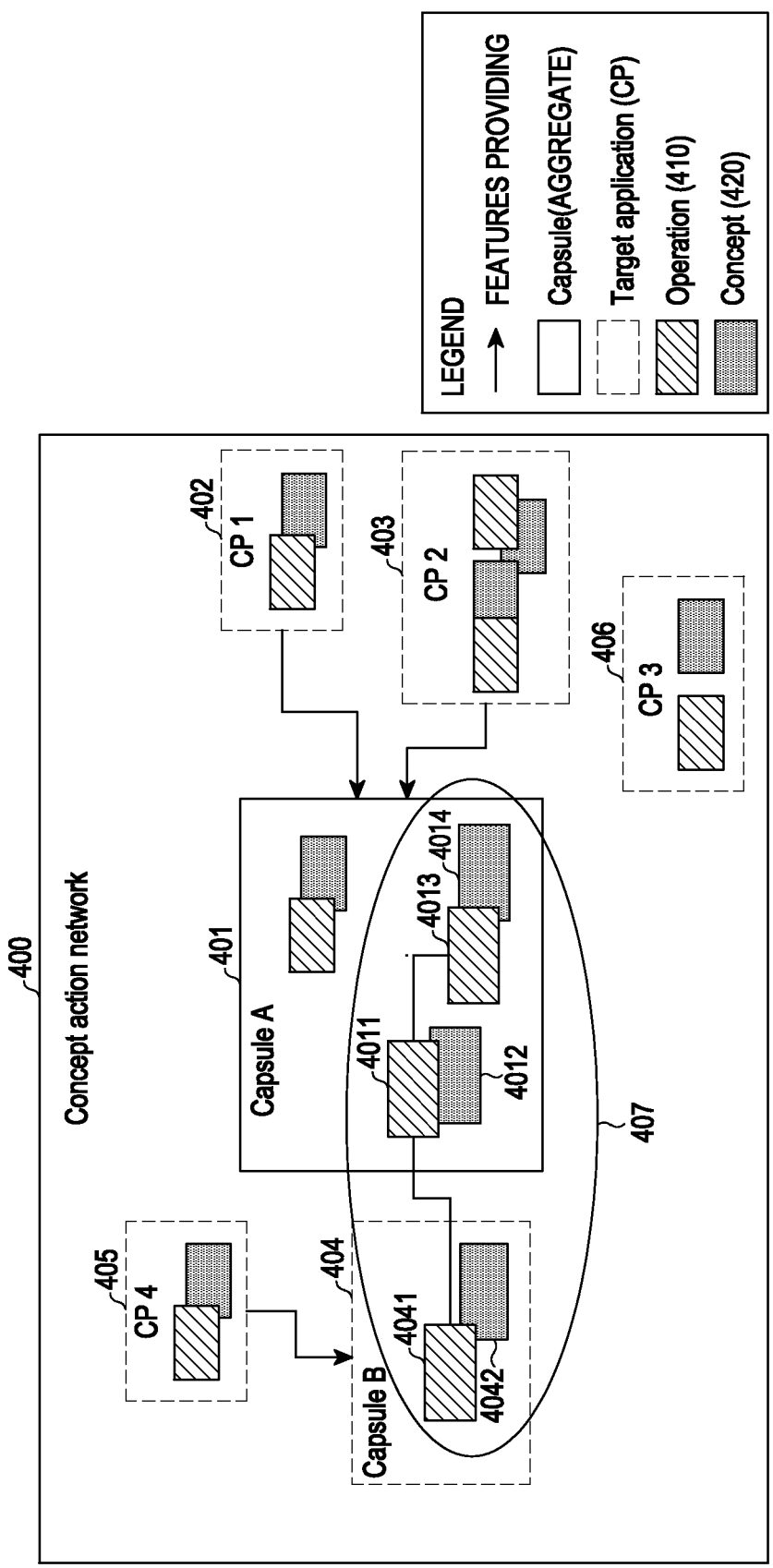
FIG. 2 illustrates the form of relationship information between concepts and actions stored in a database according to various embodiments.

FIG. 2 illustrates the form of relationship information between concepts and actions stored in a database according to various embodiments.

A capsule database 230 of the intelligent server 200 may store capsules in the form of a concept action network (CAN) 400. The capsule database may store an operation for processing a task corresponding to a user voice input and a parameter required for the operation in the form of the CAN 400.

The capsule database may store a plurality of capsules (capsule A 401 and capsule B 404) corresponding to a plurality of domains (for example, applications). According to an embodiment, one capsule (for example, capsule A 401) may correspond to one domain (for example, location (geo) or application). Further, one capsule may correspond to at least one service provider (for example, CP1 402, CP2 403, CP3 406, or CP4 405) for performing a function of the domain related to the capsule. According to an embodiment, one capsule may include one or more actions and one or more concepts for performing a predetermined function.

The natural language platform 220 may generate a plan for performing a task corresponding to the received voice input through the capsules stored in the capsule database. For example, the planner module 225 of the natural language platform may generate a plan through capsules stored in the capsule database. For example, a plan 407 may be generated using actions 4011 and 4013 and concepts 4012 and 4014 of capsule A 401 and an action 4041 and a concept 4042 of capsule B 404.

Figure 3:
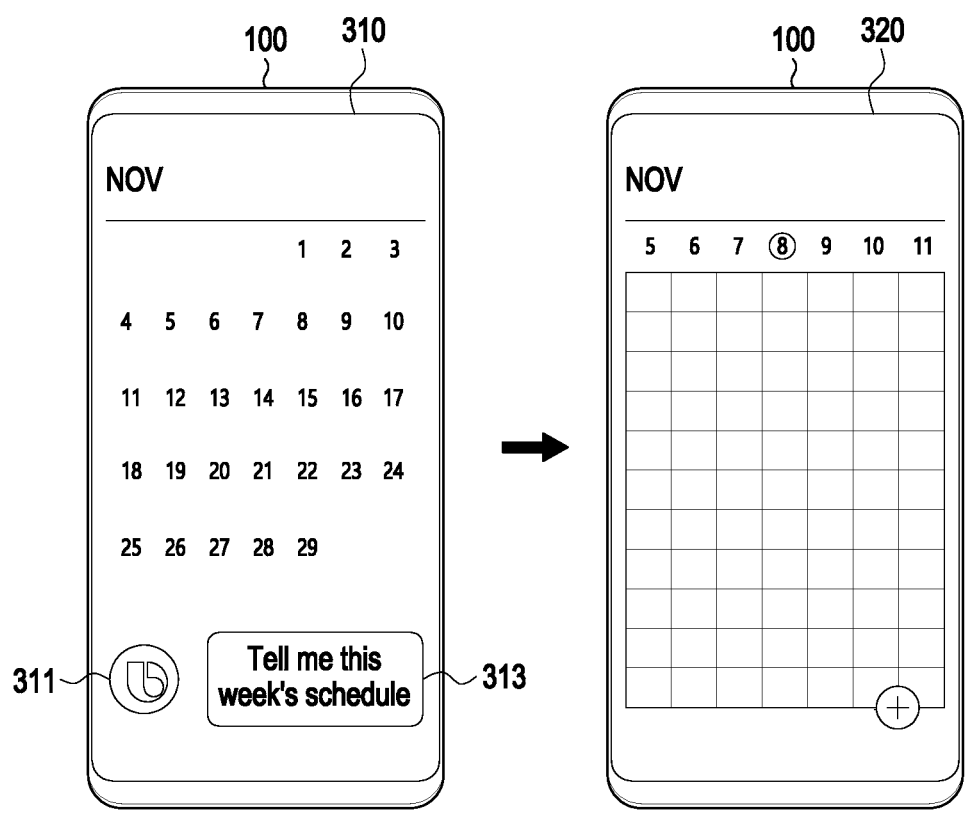
FIG. 3 illustrates a user terminal displaying a screen for processing a voice input received through the intelligent app according to various embodiments.

FIG. 3 illustrates screens for processing a user voice received by a user terminal through an intelligent app according to various embodiments.

The user terminal 100 may execute an intelligent app in order to process a user input through the intelligent server 200.

According to an embodiment, when the user terminal 100 recognizes a predetermined voice input (for example, "wake up!") or receives an input through a hardware key (for example, a dedicated hardware key) in a screen 310, the user terminal 100 may execute an intelligent app for processing the voice input. The user terminal 100 may execute the intelligent app in a state in which, for example, a schedule app is executed. According to an embodiment, the user terminal 100 may display an object 311 (for example, an icon) corresponding to the intelligent app on the display 140. According to an embodiment, the user terminal 100 may receive the voice input by a user utterance. For example, the user terminal 100 may receive a voice input "Let me know my schedule this week". According to an embodiment, the user terminal 100 may display a User Interface (UI) 313 (for example, an input window) of the intelligent app displaying text data of the received voice input on the display.

According to an embodiment, in a screen 320, the user terminal 100 may display the result corresponding to the received voice input on the display. For example, the user terminal 100 may receive a plan corresponding to the received user input and display the "this week's schedule" on the display according to the plan.

Figure 4:
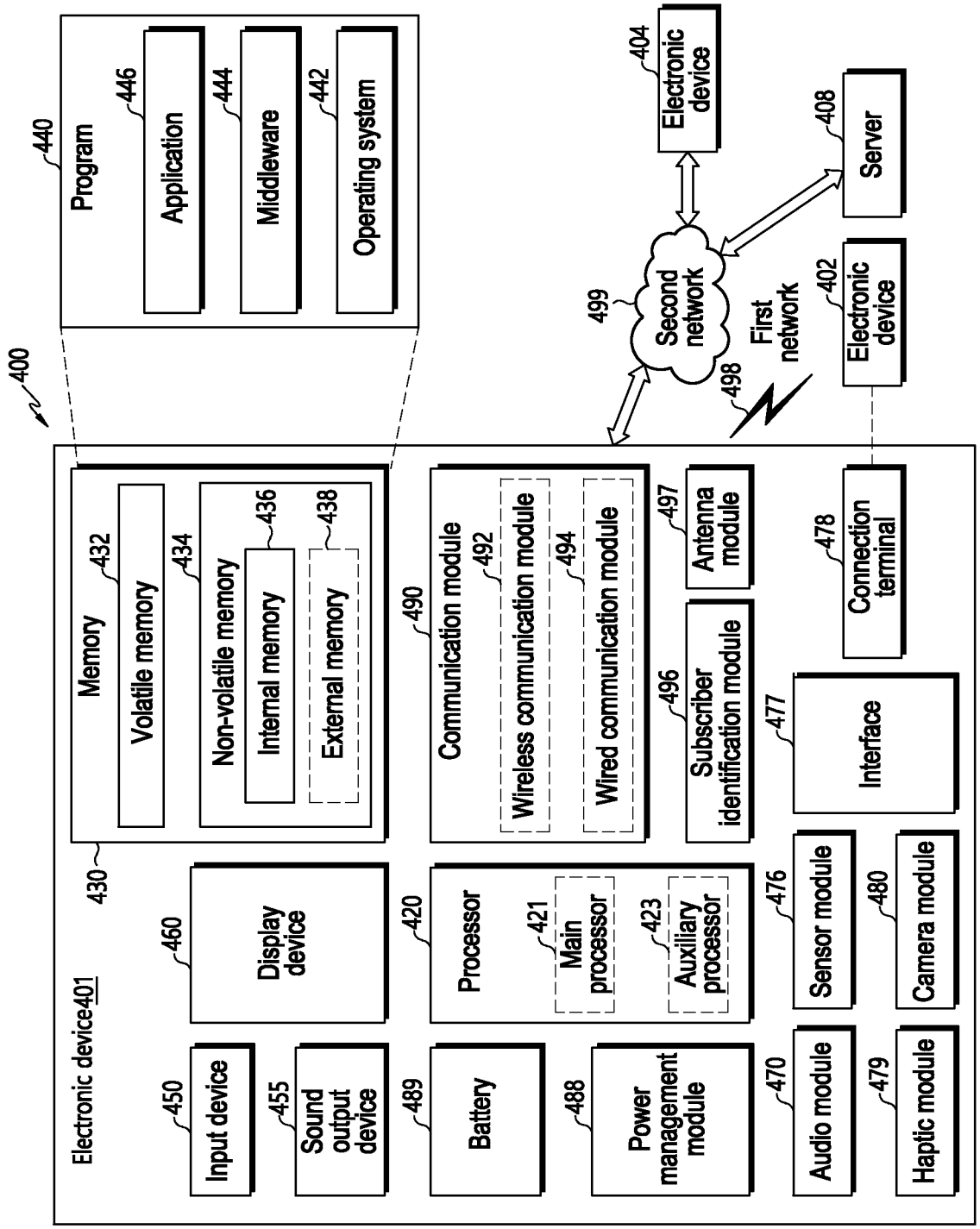
FIG. 4 is a block diagram illustrating an electronic device within a network environment according to various embodiments.

FIG. 4 is a block diagram illustrating an electronic device 401 in a network environment 400 according to various embodiments. Referring to FIG. 4, the electronic device 401 (e.g., the user terminal 100 of FIG. 1) in the network environment 400 may communicate with an electronic device 402 via a first network 498 (e.g., a short-range wireless communication network), or an electronic device 404 or a server 408 via a second network 499 (e.g., a long-range wireless communication network). According to an embodiment, the electronic device 401 may communicate with the electronic device 404 via the server 408. According to an embodiment, the electronic device 401 may include a processor 420, memory 430, an input module 450, a sound output module 455, a display module 460, an audio module 470, a sensor module 476, an interface 477, a connecting terminal 478, a haptic module 479, a camera module 480, a power management module 488, a battery 489, a communication module 490, a subscriber identification module (SIM) 4%, or an antenna module 497. In some embodiments, at least one of the components (e.g., the connecting terminal 478) may be omitted from the electronic device 401, or one or more other components may be added in the electronic device 401. In some embodiments, some of the components (e.g., the sensor module 476, the camera module 480, or the antenna module 497) may be implemented as a single component (e.g., the display module 460).

The processor 420 may execute, for example, software (e.g., a program 440) to control at least one other component (e.g., a hardware or software component) of the electronic device 401 coupled with the processor 420, and may perform various data processing or computation. According to one embodiment, as at least part of the data processing or computation, the processor 420 may store a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), or an auxiliary processor 423 (e.g., a graphics processing unit (GPU), a neural processing unit (NPU), an image signal processor (ISP), a sensor hub processor, or a communication processor (CP)) that is operable independently from, or in conjunction with, the main processor 421. For example, when the electronic device 401 includes the main processor 421 and the auxiliary processor 423, the auxiliary processor 423 may be adapted to consume less power than the main processor 421, or to be specific to a specified function. The auxiliary processor 423 may be implemented as separate from, or as part of the main processor 421.

The auxiliary processor 423 may control, for example, at least some of functions or states related to at least one component (e.g., the display module 460, the sensor module 476, or the communication module 490) among the components of the electronic device 401, instead of the main processor 421 while the main processor 421 is in an inactive (e.g., sleep) state, or together with the main processor 421 while the main processor 421 is in an active (e.g., executing an application) state. According to an embodiment, the auxiliary processor 423 (e.g., an ISP or a CP) may be implemented as part of another component (e.g., the camera module 480 or the communication module 490) functionally related to the auxiliary processor 423. According to an embodiment, the auxiliary processor 423 (e.g., the neural processing unit) may include a hardware structure specified for artificial intelligence model processing. An artificial intelligence model may be generated by machine learning. Such learning may be performed, e.g., by the electronic device 401 where the artificial intelligence is performed or via a separate server (e.g., the server 408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input module 450 may receive a command or data to be used by another component (e.g., the processor 420) of the electronic device 401, from the outside (e.g., a user) of the electronic device 401. The input module 450 may include, for example, a microphone, a mouse, a keyboard, a key (e.g., a button), or a digital pen (e.g., a stylus pen).

The sound output module 455 may output sound signals to the outside of the electronic device 401. The sound output module 455 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 460 may visually provide information to the outside (e.g., a user) of the electronic device 401. The display module 460 may include, for example, a display, a hologram device, or a projector and control circuitry to control a corresponding one of the display, hologram device, and projector. According to an embodiment, the display module 460 may include a touch sensor adapted to detect a touch, or a pressure sensor adapted to measure the intensity of force incurred by the touch.

The audio module 470 may convert a sound into an electrical signal and vice versa. According to an embodiment, the audio module 470 may obtain the sound via the input module 450, or output the sound via the sound output module 455 or an external electronic device (e.g., an electronic device 402 (e.g., a speaker or a headphone)) directly or wirelessly coupled with the electronic device 401.

The sensor module 476 may detect an operational state (e.g., power or temperature) of the electronic device 401 or an environmental state (e.g., a state of a user) external to the electronic device 401, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 402) directly or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 402). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, ISPs, or flashes.

The power management module 488 may manage power supplied to the electronic device 401. According to one embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 402, the electronic device 404, or the server 408) and performing communication via the established communication channel. The communication module 490 may include one or more communication processors that are operable independently from the processor 420 (e.g., the AP) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device 404 via the first network 498 (e.g., a short-range communication network, such as Bluetooth™, wireless-fidelity (Wi-Fi) direct, or infrared data association (IrDA)) or the second network 499 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 492 may identify or authenticate the electronic device 401 in a communication network, such as the first network 498 or the second network 499, using subscriber information (e.g., international mobile subscriber identity (IMSI)) stored in the subscriber identification module 496.

The wireless communication module 492 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 492 may support a high-frequency band (e.g., the mmWave band) to achieve, e.g., a high data transmission rate. The wireless communication module 492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 492 may support various requirements specified in the electronic device 401, an external electronic device (e.g., the electronic device 404), or a network system (e.g., the second network 499). According to an embodiment, the wireless communication module 492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 497 may transmit or receive a signal or power to or from the outside (e.g., the external electronic device) of the electronic device 401. According to an embodiment, the antenna module 497 may include an antenna including a radiating element composed of a conductive material or a conductive pattern formed in or on a substrate (e.g., a printed circuit board (PCB)). According to an embodiment, the antenna module 497 may include a plurality of antennas (e.g., array antennas). In such a case, at least one antenna appropriate for a communication scheme used in the communication network, such as the first network 498 or the second network 499, may be selected, for example, by the communication module 490 from the plurality of antennas. The signal or the power may then be transmitted or received between the communication module 490 and the external electronic device via the selected at least one antenna. According to an embodiment, another component (e.g., a radio frequency integrated circuit (RFIC)) other than the radiating element may be additionally formed as part of the antenna module 497.

According to various embodiments, the antenna module 497 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 404 via the server 408 coupled with the second network 499. Each of the electronic devices 402 or 404 may be a device of a same type as, or a different type, from the electronic device 401. According to an embodiment, all or some of operations to be executed at the electronic device 401 may be executed at one or more of the external electronic devices 402, 404, or 408. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, mobile edge computing (MEC), or client-server computing technology may be used, for example. The electronic device 401 may provide ultra low-latency services using, e.g., distributed computing or mobile edge computing. In another embodiment, the external electronic device 404 may include an internet-of-things (IoT) device. The server 408 may be an intelligent server using machine learning and/or a neural network. According to an embodiment, the external electronic device 404 or the server 408 may be included in the second network 499. The electronic device 401 may be applied to intelligent services (e.g., smart home, smart city, smart car, or healthcare) based on 5G communication technology or IoT-related technology.

Figure 5:
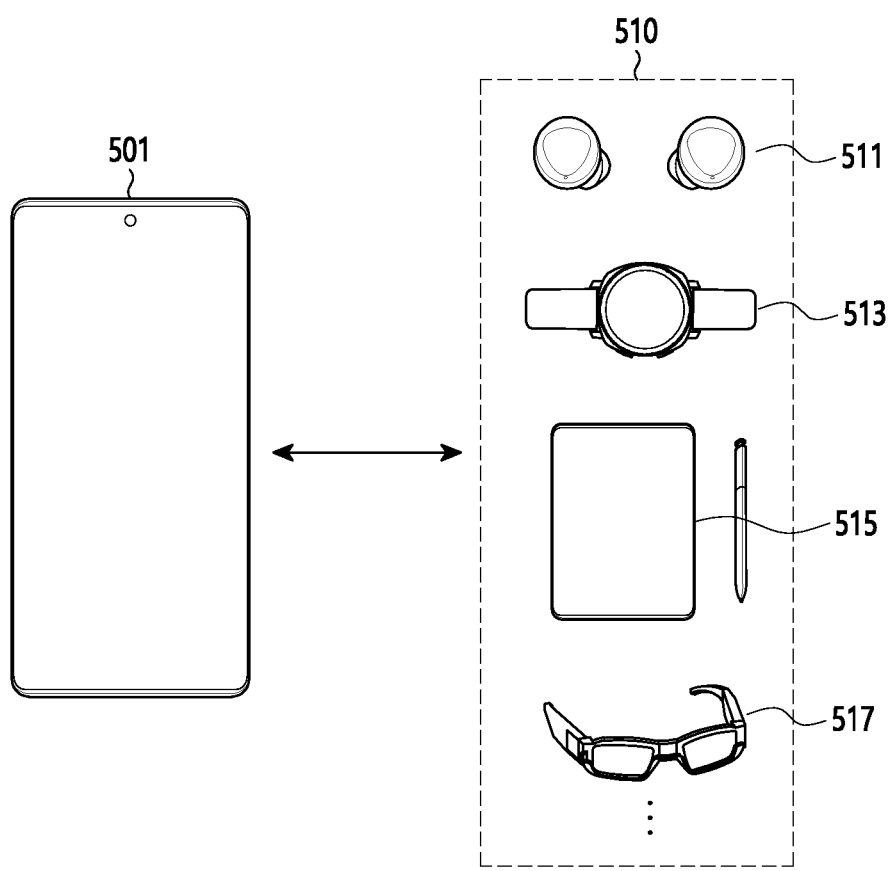
FIG. 5 illustrates an operation in which an electronic device is unlocked on the basis of authentication information received from at least one external device according to various embodiments.

FIG. 5 illustrates an operation in which an electronic device is unlocked on the basis of authentication information received from at least one external device according to various embodiments.

Referring to FIG. 5, according to various embodiments, an electronic device 501 (for example, the user terminal 100 of FIG. 1 and/or the electronic device 401 of FIG. 4) may establish a short-range wireless communication connection (for example, Bluetooth, Wi-Fi direct, or IrDA) with at least one external device 510 (for example, a first external device 511, a second external device 513, a third external device 515, or a fourth external device 517), one external device among the at least one external device 510, or some external devices among the at least one external device 510. According to various embodiments, the electronic device 501 (for example, the user terminal 100 of FIG. 1 and/or the electronic device 401 of FIG. 4) may acquire a first user utterance making a request for a task which can be executed in an unlocked state of the electronic device from one external device (for example, the first external device 511) among the at least one external device 510. The electronic device 501 may determine an external device which can unlock the electronic device among the at least one external device 510 based on first information (for example, type and/or ID of the external device) on each of the at least one external device 510. The electronic device 501 may change a first unlocking type configured in the electronic device to a second unlocking type in which the electronic device can be unlocked using the determined external device. The electronic device 501 may unlock the electronic device based on user authentication information received from the determined external device and execute the task corresponding to the first user utterance.

According to various embodiments, at least one external device 510 may be an element that is similar to or the same as at least a portion of the electronic device 501.

According to various embodiments, at least one external device 510 is an external device capable of establishing a short-range wireless communication connection (for example, Bluetooth, Wi-Fi direct, or IrDA) with the electronic device 501 and may include external devices such as earphones 511, a watch phone 513, a tablet 515, and glasses 517. One external device (for example, the first external device 511) among the at least one external device 510 may acquire the first user utterance making the request for the task which can be executed in the unlocked state of the electronic device and transmit the acquired first user utterance to the electronic device 501 having the short-range wireless communication connection. One external device among the at least one external device 510 may make a request for a user authentication information operation to the user according to a request from the electronic device 501 and transmit user authentication information generated according to the user authentication information operation of the user to the electronic device 501 having the short-range wireless communication connection.

Figure 6:
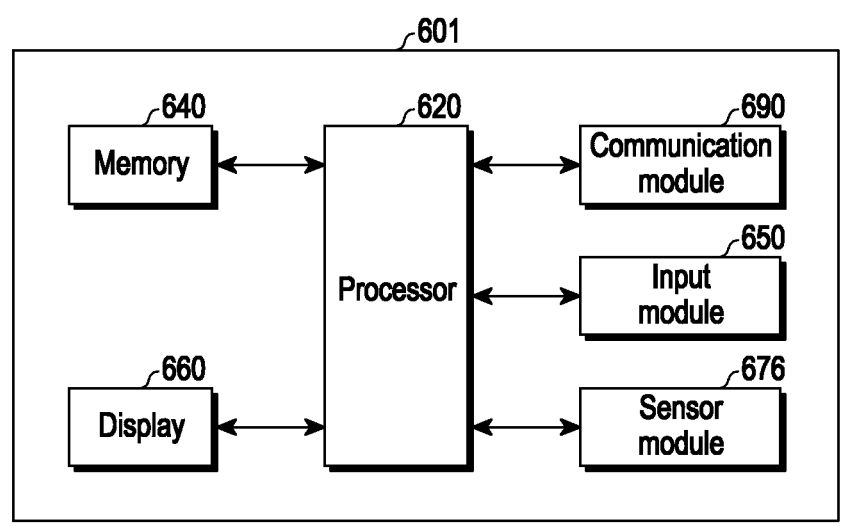
FIG. 6 is a block diagram illustrating an electronic device according to various embodiments.

FIG. 6 is a block diagram illustrating an electronic device according to various embodiments.

Referring to FIG. 6, an electronic device 601 (for example, the user terminal 100 of FIG. 1, the electronic device 401 of FIG. 4, and/or the electronic device 501 of FIG. 5) may include a processor 620 (for example, the processor 160 of FIG. 1 or the processor 420 of FIG. 4), a memory 640 (for example, the memory 150 of FIG. 1 or the memory 430 of FIG. 4), an input module 650 (for example, the microphone 120 of FIG. 1 or the input module 450 of FIG. 4), a display 660 (for example, the display 140 of FIG. 1 or the display module 460 of FIG. 4), a sensor module 676 (for example, the sensor module 476 of FIG. 4), and/or a communication module 690 (for example, the communication interface 110 of FIG. 1 or the communication module 490 of FIG. 4).

According to various embodiments, when a locked state of the electronic device 601 and a first state of the electronic device 601 are identified when the first user utterance making the request for the task which can be executed in the unlocked state of the electronic device is acquired, the processor 620 (for example, the processor 160 of FIG. 1 and/or the processor 420 of FIG. 4) may change an unlocking type configured in the electronic device to an unlocking type of an external device, in which the electronic device can be unlocked on the basis of user authentication information that can be generated in an external device, on the basis of first information of the external device communicatively connected to the electronic device 60, unlock the electronic device on the basis of the user authentication information acquired from the external device, and then execute the task corresponding to the first user utterance.

According to various embodiments, when a locked state of the electronic device 601 and a first state of the electronic device 601 are identified when the first user utterance making the request for the task which can be executed in the unlocked state of the electronic device is acquired from the first external device (for example, the first external device 511 of FIG. 5) while the first external device is communicatively connected to the electronic device 601, the processor 620 (for example, the processor 160 of FIG. 1 and/or the processor 420 of FIG. 4) may change the first unlocking type configured in the electronic device to the second unlocking type, in which the electronic device can be unlocked on the basis of user authentication information that can be generated in the first external device, on the basis of first information of the first external device, unlock the electronic device on the basis of the user authentication information acquired form the first external device, and then execute the task corresponding to the first user utterance.

According to an embodiment, the processor 620 may establish a short-range wireless communication connection (for example, Bluetooth, Wi-Fi direct, or IrDA) between the electronic device 601 and the first external device through the communication module 690.

According to an embodiment, the processor 620 may identify whether the first user utterance acquired from the first external device includes a wake-up utterance (for example. "Hi, Bixby") capable of calling a virtual assistant for a voice recognition service.

According to an embodiment, when it is identified that the user utterance acquired from the first external device is the first user utterance making the request for the task which can be executed in the unlocked state of the electronic device, the processor 620 may identify whether the electronic device is in the unlocked state and whether the electronic device is in the first state.

According to an embodiment, the processor 620 may identify whether the electronic device 601 is in the first state based on sensor information collected by the sensor module 676. The first state of the electronic device 601 is a state in which the user is not holding the electronic device 601 and may indicate, for example, a state in which the electronic device 601 is put in a bag or pocket and thus the user is not holding the electronic device 601 or a state in which the user is driving or cooking and thus is not holding the electronic device 601. For example, it may be identified whether the electronic device is in the first state based on of sensor information collected through a luminance sensor included in the sensor module 676, a signal strength information between the electronic device 601 and the first external device worn on the user, or sensor information collected through a proximity sensor or a grip sensor.

According to an embodiment, the processor 620 may identify the second unlocking type, in which the electronic device can be unlocked based on user authentication information that can be generated in the first external device, in a table for determining an unlocking type of the external device stored in the memory 640 on the basis of the first information of the first external device. The processor 620 may identify user authentication information and the second unlocking type in which the electronic device can be unlocked on the basis of the user authentication information in the table for determining the unlocking type of the external device stored in the memory 640 on the basis of type information of the first external device and an ID of the first external device included in the first information of the first external device.

The processor 620 may detect the first information of the first external device in connection information acquired to establish the short-range wireless communication connection with the first external device or acquire the first information of the first external device from first user utterance information including the first user utterance or acquire the same by making a request for the same to the first external device.

According to an embodiment, after changing the first unlocking type configured in the electronic device to the second unlocking type based on the first information of the first external device, the processor 620 may make a request for user authentication information for the second unlocking type to the first external device. When receiving the user authentication information from the first external device, the processor 620 may compare the user authentication information for the second unlocking type stored in the table for determining the unlocking type of the external device in the memory 640 with the user authentication information received from the first external device, unlock the electronic device when the comparison result matches, and then execute the task corresponding to the first user utterance.

According to various embodiments, when the locked state of the electronic device 601 and the first state of the electronic device 601 are identified when the first user utterance making the request for the task which can be executed in the unlocked state of the electronic device is acquired from the first external device (for example, the first external device 511 of FIG. 5) among a plurality of external devices while the plurality of external devices are communicatively connected to the electronic device 601, the processor 620 (for example, the processor 160 of FIG. 1 and/or the processor 420 of FIG. 4) may determine a second external device (for example, the second external device 513 of FIG. 5) among the plurality of external devices as an external device for unlocking the electronic device on the basis of the first information of each of the plurality of external devices. The processor 620 may change the first unlocking type configured in the electronic device to a third unlocking type, in which the electronic device can be unlocked based on user authentication information that can be generated in the second external device, on the basis of the first information of the second external device, unlock the electronic device on the basis of the user authentication information acquired from the second external device, and then execute the task corresponding to the first user utterance.

According to an embodiment, the processor 620 may make a request for the first information to the plurality of external devices and collect the first information from each of the plurality of external devices. The processor 620 may determine the second external device registered in the table for determining the unlocking type of the external device stored in the memory 640 among the plurality of external devices as the external device for unlocking the electronic device on the basis of the collected first information (for example, the type of the external device and/or an ID of the external device). When it is identified that the number of external devices registered in the table for determining the unlocking type of the external device among the plurality of external devices is at least two, the second external device may be determined as the external device for unlocking the electronic device based on priorities of the unlocking types for security. For example, when it is identified that the number of external devices registered in the table for determining the unlocking type of the external device among the plurality of external devices is at least two and unlocking types of the at least two external devices are a password unlocking type and a fingerprint recognition unlocking type, the processor 620 may determine that the second external device registered as the fingerprint recognition unlocking type is the external device for unlocking the electronic device on the basis of the priorities of the unlocking types for security. When it is identified that the number of external devices registered in the table for determining the unlocking type of the external device among the plurality of external devices is at least two, the processor 620 may determine that the second external device is the external device for unlocking the electronic device according to user selection.

According to an embodiment, the processor 620 may identify the number of the plurality of external devices having the connection of short-range wireless communication, a type and an ID of each of the plurality of external devices, and state information (for example, a sleep mode or a wake-up mode) of each of the plurality of external devices on the basis of the first information collected from each of the plurality of external devices.

According to an embodiment, the second external device determined as the external device for unlocking the electronic device may indicate an external device which is the same as the first external device acquiring the first user utterance or an external device which is different from the first external device.

According to an embodiment, when it is determined that the second external device which is different from the first external device acquiring the first user utterance is the external device for unlocking the electronic device 601 among the plurality of external devices, the processor 620 may transmit first information of the second external device and information on the third unlocking type to the first external device in order to inform the user of performance of the user authentication operation for unlocking the electronic device 601 using the second external device through the first external device. For example, when the first external device is earphones (for example, the earphones 511 of FIG. 5) worn on a user's ears and the second external device is a watch phone (for example, the watch phone 513 of FIG. 5) worn on a user's wrist, the processor 620 may inform the user to perform a user authentication operation to unlock the electronic device on the watch phone through a speaker included in the earphones.

According to an embodiment, after changing the first unlocking type configured in the electronic device 601 to the third unlocking type based on first information of the second external device, the processor 620 may make a request for user authentication information for the third unlocking type to the second external device.

Upon receiving the user authentication information from the second external device, the processor 620 may compare the user authentication information for the third unlocking type stored in the table for determining the unlocking type of the external device in the memory 640 with user authentication information received from the second external device, unlock the electronic device when the comparison result matches, and then perform the task corresponding to the first user utterance.

According to various embodiments, when a first user utterance making a request for a task which can be executed in an unlocked state of the electronic device is acquired from a first external device (for example, the first external device 511 of FIG. 5) while the first external communicatively connected to the electronic device 601, the processor 620 (for example, the processor 160 of FIG. 1 and/or the processor 420 of FIG. 4) may identify a locked state of the electronic device 601 and a first state of the electronic device 601. When it is not determined that the first external device is an external device for unlocking the electronic device based on first information of the first external device, the processor 620 may make a request for the first information to neighboring external devices (for example, the second external device 513, the third external device 515, or the fourth external device 517 of FIG. 5) having no short-range wireless communication. The processor 620 may determine the third external device (for example, the third external device 515 of FIG. 5) among the neighboring external devices as the external device for unlocking the electronic device 601 based on the first information acquired from the neighboring external devices and establish the short-range communication connection with the third external device. The processor 620 may change the first unlocking type configured in the electronic device to a fourth unlocking type, in which the electronic device can be unlocked based on user authentication information that can be generated in the third external device, on the basis of the first information of the third external device, unlock the electronic device based on the user authentication information acquired from the third external device, and then execute the task corresponding to the first user utterance.

According to an embodiment, when it is identified that the first external device is not registered in the table for determining the unlocking type of the external device in the memory 640 based on the first information of the first external device acquiring the first user utterance, the processor 620 may not determine that the first external device is the external device for unlocking the electronic device.

According to an embodiment, the processor 620 may make a request for the first information to neighboring external devices having no short-range wireless communication connection through a BLE communication module included in the communication module 690 and determine the third external device registered in the table for determining the unlocking type of the external device in the memory 640 among the neighboring external devices as the external device for unlocking the electronic device 601 based on of the first information collected from each of the neighboring external devices. The processor 620 may establish the short-range wireless communication connection between the electronic device 601 and the third external device through the communication module 690.

According to an embodiment, the processor 620 may identify the number of neighboring external devices that have no short-range wireless communication, a type and an ID of each of the neighboring external devices, and state information (for example, a sleep mode or a wake-up mode) of each of the neighboring external devices based on first information collected from the neighboring external devices.

According to an embodiment, when the third external devices among the neighboring external devices is determined as the external device for unlocking the electronic device, the processor 620 may transmit first information of the third external device and information on the fourth unlocking type to the first external device in order to instruct the user to perform the user authentication operation for unlocking the electronic device using the third external device through the first external device acquiring the first user utterance.

According to an embodiment, after changing the first unlocking type configured in the electronic device to the fourth unlocking type based on the first information of the third external device, the processor 620 may make a request for user authentication information for the fourth unlocking type to the third external device. Upon receiving the user authentication information from the third external device, the processor 620 may compare the user authentication information for the fourth unlocking type stored in the table for determining the unlocking type of the external device in the memory 640 with user authentication information received from the third external device, unlock the electronic device when the comparison result matches, and then perform the task corresponding to the first user utterance.

According to various embodiments, the processor 620 (for example, the processor 160 of FIG. 1 and/or the processor 420 of FIG. 4) may store the table for determining the unlocking type of the external device for unlocking the electronic device in the memory 640. The processor 620 may generate the table for determining the unlocking type of the external device based on a capability of at least one external device establishing the short-range wireless communication connection with the electronic device 601 or a capability of at least one external device according to a user request and store the generated table in the memory 640.

According to an embodiment, the table for determining the unlocking type of the external device may store first information of the external device (for example, a type and/or an ID of the external device), an unlocking type (for example, a password, a pattern, fingerprint authentication, and/or biometric authentication), a user authentication information type (for example, voice information, number authentication information, fingerprint authentication information, and/or biometric authentication information), user authentication information for unlocking, and/or a UI type informing of unlocking of the electronic device through the external device, which are associated with each other.

For example, when the first external device is earphones (for example, the earphones 511 of FIG. 5) including a microphone capable of receiving voice information, the processor 620 may store earphones and an ID of the earphones as the first information of the external device, a password as the unlocking type, voice information as the user authentication information type, number authentication information (for example, "4545" registered by the user) as the user authentication information for unlocking, and a UI for displaying unlocking of the electronic device using the earphones as the UI type in the table for determining the unlocking type of the external device.

For example, when the first external device is a watch phone (for example, the watch phone 513 of FIG. 5) including a display capable of receiving number information, the processor 620 may store a watch phone and an ID of the watch phone as the first information of the external device, a password as the unlocking type, number information as the user authentication information type, number information (for example, "3535" registered by the user) as the user authentication information for unlocking, and a UI for displaying unlocking of the electronic device using the watch phone as the UI type in the table for determining the unlocking type of the external device.

According to an embodiment, when the external device for unlocking the electronic devices is determined, the processor 620 may determine the unlocking type, the user authentication information type, the user authentication information for unlocking, and/or the UI type for informing of unlocking of the electronic device using the external device in the table for determining the unlocking type of the external device based on the first information (for example, the type and the ID of the external device) of the determined external device.

According to various embodiments, the memory 640 (for example, the memory 150 of FIG. 1 and/or the memory 430 of FIG. 4) may store the table for determining the unlocking type of the external device for unlocking the electronic device using the external device.

According to various embodiments, the input module 650 (for example, the microphone 120 of FIG. 1 and/or the input module 450 of FIG. 4) may acquire a user utterance.

According to various embodiments, the display 660 (for example, the display 140 of FIG. 1 and/or the display module 460 of FIG. 4) may display various screens, for example, a locked screen, a home screen, an execution screen of an app, or a keypad screen according to the use of the electronic device 601 under the control of the processor 620.

According to various embodiments, the display 660 may display a type of the external device used for unlocking and a UI for informing of unlocking of the electronic device using the external device.

According to various embodiments, the sensor module 676 (for example, the sensor module 476 of FIG. 4) may include at least one sensor for detecting a state of the electronic device 601. According to an embodiment, the sensor module 676 may detect at least one of shaking of the electronic device 601 and pressure applied to the electronic device 601.

According to an embodiment, the sensor module 676 may include a proximity sensor for detecting whether the external device approaches the electronic device 601, a luminance sensor for detecting an amount of ambient light of the electronic device 601, a motion sensor (not shown) for detecting an operation (for example, a rotation of the electronic device 601, or an acceleration or a vibration applied to the electronic device 601) of the electronic device 601, a geo-magnetic sensor (not shown) for detecting a point of the compass by using the Earth's magnetic field, a gravity sensor for detecting an action direction of gravity, an altimeter for measuring an atmospheric pressure to detect an altitude, and/or a grip sensor for detecting whether the user is holding the electronic device 601. The sensor module 776 may transmit the detected signal to the processor 620.

According to various embodiments, the communication module 690 (for example, the communication interface 110 of FIG. 1 and/or the communication module 490 of FIG. 4) may include a plurality of communication circuits using different communication technologies.

According to an embodiment, the communication module 690 may include a mobile communication module (not shown) or a sub communication module (not shown) for performing short-range communication with a WLAN. The communication module 690 may communicate with the external device through at least one antenna (not shown) according to the control of the processor 620.

According to an embodiment, the communication module 690 may include at least one of a WLAN module (not shown) and a short-range communication module (not shown), and the short-range communication module (not shown) may include an NFC communication module, a Bluetooth legacy communication module, and/or a BLE communication module.

According to various embodiments, an electronic device 1030 (for example, the user terminal 100 of FIG. 1, the electronic device 401 of FIG. 4, or the electronic device 601 of FIG. 6) may include a memory (for example, the memory 640 of FIG. 6), a communication module (for example, the communication module 690), and a processor (for example, the processor 620 of FIG. 6) operatively connected to the memory and the communication module, wherein the processor may be configured to, if a locked state of the electronic device and a first state of the electronic device are identified when a first user utterance is acquired that requests a task executable in an unlocked state of the electronic device, change an unlocking type of the electronic device to an unlocking type of an external device, based on first information of the external device. The external device is communicatively connected to the electronic device through the communication module. The processor may also be configured to unlock the electronic device, which is configured with the unlocking type, based on user authentication information acquired from the external device, and execute the task corresponding to the first user utterance.

According to various embodiments, the processor may be further configured to identify whether the first user utterance includes a wake-up utterance that can call a virtual assistant.

According to various embodiments, the electronic device may further include a sensor module, and the processor may be further configured to identify the first state of the electronic device, based on sensor information collected through the sensor module.

According to various embodiments, the processor may be configured to identify the user authentication information, which can be generated in the external device, and the unlocking type of the external device, in the memory based on the first information of the external device.

According to various embodiments, the processor may be further configured to, if a locked state of the electronic device and a first state of the electronic device are identified when a first user utterance making a request for a task, which can be executed in an unlocked state of the electronic device, is acquired from a first external device while the first external device is communicatively connected to the electronic device, change a first unlocking type configured in the electronic device to a second unlocking type of the first external device, based on first information of the first external device, unlock the electronic device configured in the second unlocking type, based on user authentication information acquired from the first external device, and then execute a task corresponding to the first user utterance.

According to various embodiments, the processor may be further configured to, if the locked state of the electronic device and the first state of the electronic device are identified when the first user utterance is acquired from the first external device among a plurality of external devices while the plurality of external devices are communicatively connected to the electronic device, determine a second external device among the plurality of external devices as an external device for unlocking the electronic device on the basis of first information acquired from each of the plurality of external devices, change a first unlocking type configured in the electronic device to a third unlocking type of the second external device on the basis of first information of the second external device, unlock the electronic device configured in the third unlocking type on the basis of user authentication information acquired from the second external device, and then execute the task corresponding to the first user utterance.

According to various embodiments, the processor may be configured to transmit the first information of the second external device and information on the third unlocking type to the first external device in order to inform a user of unlocking of the electronic device using the second external device through the first external device.

According to various embodiments, the processor may be configured to, when it is identified that the first external device cannot be used as the external device for unlocking the electronic device, based on the first information of the first external device, make a request for first information to neighboring external devices that are not communicatively connected to the electronic device when a third external device among the neighboring external devices is determined as the external device for unlocking the electronic device, based on the first information acquired from the neighboring external devices, perform an operation for a connection with the third external device, change the first unlocking type configured in the electronic device to a fourth unlocking type on the basis of first information of the third external device, unlock the electronic device configured in the fourth unlocking type on the basis of user authentication information acquired from the third external device communicatively connected to the electronic device, and then execute the task corresponding to the first user utterance.

According to various embodiments, the processor may be configured to identify the user authentication information, which can be generated in the third external device, and the third unlocking type, based on the first information of the third external device.

According to various embodiments, the processor may be further configured to transmit the first information of the third external device and information on the fourth unlocking type to the first external device in order to inform a user of unlocking of the electronic device using the third external device through the first external device.

Figure 7:
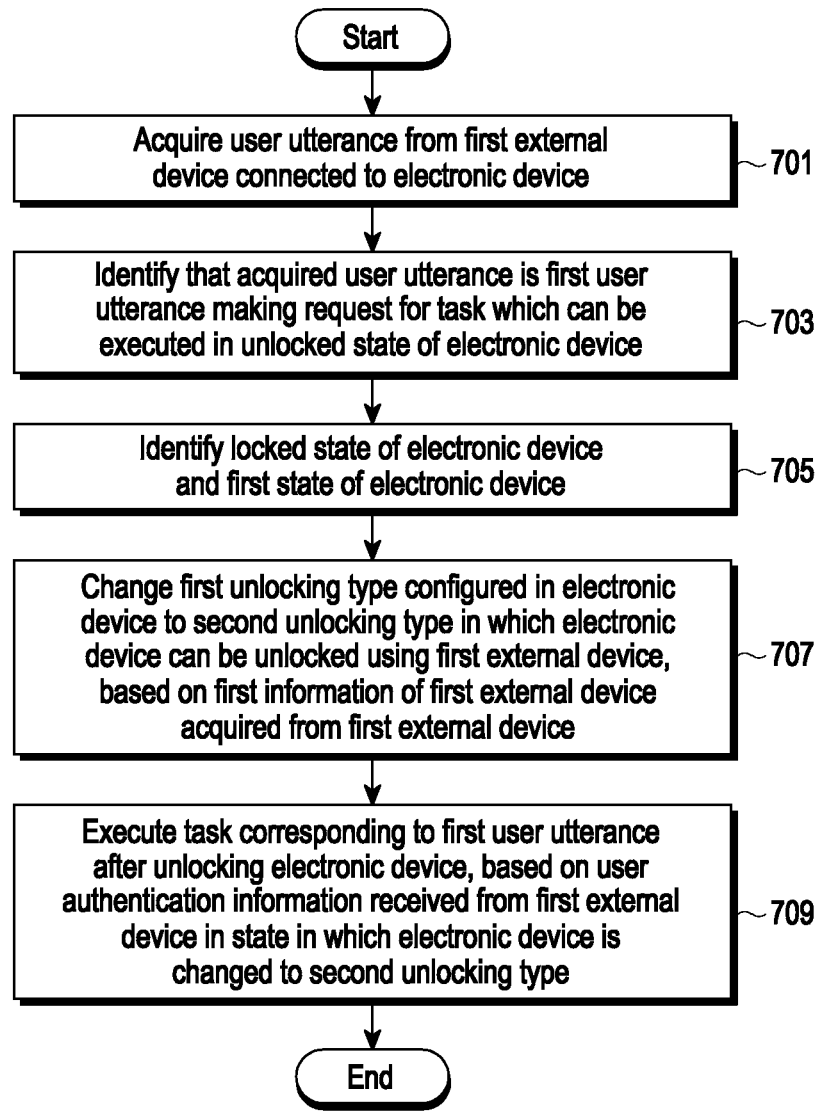
FIG. 7 is a flowchart illustrating an operation in which an electronic device is unlocked using an external device according to various embodiments.

FIG. 7 is a flowchart illustrating an operation in which an electronic device is unlocked using an external device according to various embodiments. Operations for unlocking the electronic device using the external device may include operations 701 to 709. According to an embodiment, at least one of operations 701 to 709 may be omitted, orders of some operations may be changed, or other operations may be added. The operations for unlocking the electronic device using the external device may be performed by the user terminal 100 of FIG. 1, the processor 160 of FIG. 1, the electronic device 401 of FIG. 4, the processor 420 of FIG. 4, the electronic device 601 of FIG. 6, or the processor 620 of FIG. 6.

In operation 701, the electronic device 601 may acquire a user utterance from a first external device communicatively connected through a communication module (for example, the communication module 690 of FIG. 6).

According to an embodiment, the electronic device 601 may acquire the user utterance from the first external device having short-range wireless communication through the communication module 690.

In operation 703, the electronic device 601 may identify the user utterance acquired from the first external device as a first user utterance making a request for a task which can be executed in an unlocked state of the electronic device.

According to an embodiment, when the user utterance acquired from the first external device is a user utterance making a request for performing a task related to personal information (for example, schedule information or address book information), the electronic device 601 may identify the user utterance as the first user utterance making the request for the task which can be executed in the unlocked state of the electronic device.

According to an embodiment, the electronic device 601 may identify whether the first user utterance includes a wake-up utterance which can call a virtual assistant for a voice recognition service.

In operation 705, the electronic device 601 may identify whether the electronic device is locked and the electronic device is in a first state.

According to an embodiment, the electronic device 601 may identify whether the electronic device is currently locked. The electronic device 601 may identify the first state of the electronic device in which the user is not holding the electronic device 601 based on sensor information collected through a sensor module (for example, the sensor module 676 of FIG. 6). For example, the electronic device 601 may identify the first state in which the electronic device 601 is put in a bag or a pocket, and thus, the user is not holding the electronic device 601, based on sensor information collected through a luminance sensor included in the sensor module 676. For example, the electronic device 601 may identify the first state in which the user is driving or cooking and thus is not holding the electronic device 601 on the basis of signal strength information between the electronic device 601 and the first external device worn on the user or sensor information collected through a proximity sensor or a grip sensor included in the sensor module 676.

In operation 707, the electronic device 601 may change the first unlocking type configured in the electronic device to the second unlocking type in which the electronic device can be unlocked using the first external device based on first information of the first external device acquired from the first external device.

According to an embodiment, the electronic device 601 may acquire first information of the first external device in connection information of the first external device received for the short-range wireless communication connection with the first external device, acquire first information of the first external device in first user utterance information including the first user utterance, or acquire first information of the first external device by making a request for the first information to the first external device.

According to an embodiment, the electronic device 601 may determine the second unlocking type, the user authentication information type, the user authentication information for unlocking, and/or the UI type for informing of unlocking of the electronic device using the first external device, which are stored while being associated with the type and the ID of the first external device, in the table for determining the unlocking type of the external device in the memory (for example, the memory 640 of FIG. 6) on the basis of the type and the ID of the first external device included in the first information of the first external device.

In operation 709, the electronic device may execute the task corresponding to the first user utterance after unlocking the electronic device based on the user authentication information received from the first external device in the state in which the change to the second unlocking type is made.

According to an embodiment, the electronic device may compare the user authentication information for unlocking stored in the table for determining the unlocking type of the external device in the memory with the user authentication information received from the first external device, unlock the electronic device when the comparison result matches, and then execute the task corresponding to the first user utterance in the state in which the change to the second unlocking type in which the electronic device can be unlocked using the first external device is made.

Figure 8:
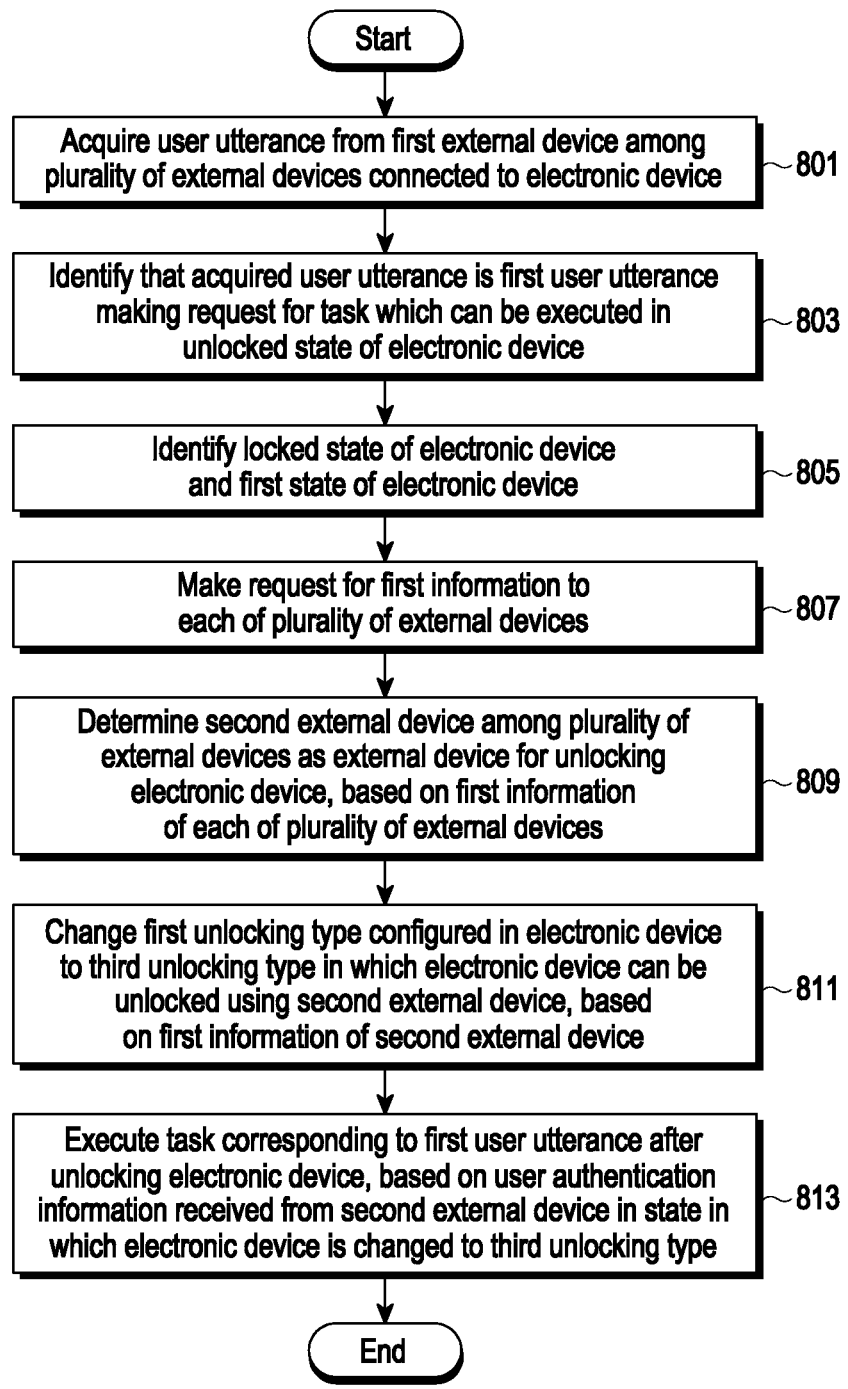
FIG. 8 is a flowchart illustrating an operation in which an electronic device is unlocked using an external device according to various embodiments.

FIG. 8 is a flowchart illustrating an operation in which an electronic device is unlocked using an external device according to various embodiments. Operations for unlocking the electronic device using the external device may include operations 801 to 813. According to an embodiment, at least one of operations 801 to 813 may be omitted, orders of some operations may be changed, or other operations may be added. The operations for unlocking the electronic device using the external device may be performed by the user terminal 100 of FIG. 1, the processor 160 of FIG. 1, the electronic device 401 of FIG. 4, the processor 420 of FIG. 4, the electronic device 601 of FIG. 6, or the processor 620 of FIG. 6.

In operation 801, the electronic device 601 may acquire a user utterance from the first external device among a plurality of external devices connected using a communication module (for example, the communication module 690 of FIG. 6).

According to an embodiment, the electronic device 601 may acquire the user utterance from the first external device among the plurality of external devices having short-range wireless communication through the communication module 690.

In operation 803, the electronic device 601 may identify the user utterance acquired from the first external device as a first user utterance making a request for a task which can be executed in an unlocked state of the electronic device.

According to an embodiment, when the user utterance acquired from the first external device is a user utterance making a request for performing a task related to personal information (for example, schedule information or address book information), the electronic device 601 may identify the user utterance as the first user utterance making the request for the task which can be executed in the unlocked state of the electronic device.

According to an embodiment, the electronic device 601 may identify whether the first user utterance includes a wake-up utterance which can call a virtual assistant for a voice recognition service.

In operation 805, the electronic device 601 may identify whether the electronic device is locked and the electronic device is in a first state.

According to an embodiment, the electronic device 601 may identify whether the electronic device is currently locked. The electronic device 601 may identify the first state of the electronic device in which the user does not hold the electronic device 601 based on sensor information collected through a sensor module (for example, the sensor module 676 of FIG. 6). For example, the electronic device 601 may identify the first state in which the electronic device 601 is put in a bag or a pocket, and thus, the user is not holding the electronic device 601, based on sensor information collected through a luminance sensor included in the sensor module. For example, the electronic device 601 may identify the first state in which the user is driving or cooking, and thus, is not holding the electronic device 601, based on signal strength information between the electronic device 601 and the first external device worn on the user or sensor information collected through a proximity sensor or a grip sensor included in the sensor module.

In operation 807, the electronic device 601 may make a request for the first information to each of the plurality of external devices.

According to an embodiment, the electronic device 601 may acquire the first information of the first external device in connection information of each of the plurality of external devices received for the short-range wireless communication connection with each of the plurality of external devices, or acquire the first information from each of the plurality of external devices by making a request for the first information to each of the plurality of external devices.

In operation 809, the electronic device 601 may determine a second external device among the plurality of external devices as the external device for unlocking the electronic device based on the first information of each of the plurality of external devices.

According to an embodiment, the electronic device 601 may identify registration of the second external device in the table for determining the unlocking type of the external device stored in a memory (for example, the memory 640 of FIG. 6) based on the first information of each of the plurality of external devices and determine the second external device as the external device for unlocking the electronic device.

In operation 811, the electronic device 601 may change the first unlocking type configured in the electronic device to the third unlocking type in which the electronic device can be unlocked using the second external device based on the first information of the second external device.

According to an embodiment, the electronic device 601 may determine the third unlocking type, the user authentication information type, the user authentication information for unlocking, and/or the UI type for informing of unlocking of the electronic device using the second external device, which are stored while being associated with the type and the ID of the second external device, in the table for determining the unlocking type of the external device in the memory (for example, the memory 640 of FIG. 6) based on the type and the ID of the first external device included in the first information of the second external device.

In operation 813, the electronic device may execute the task corresponding to the first user utterance after unlocking the electronic device on the basis of the user authentication information received from the second external device in the state in which the change to the third unlocking type is made.

According to an embodiment, the electronic device may compare the user authentication information for unlocking stored in the table for determining the unlocking type of the external device in the memory with the user authentication information received from the second external device, unlock the electronic device when the comparison result matches, and then execute the task corresponding to the first user utterance in the state in which the change to the third unlocking type in which the electronic device can be unlocked using the second external device is made.

Figure 9:
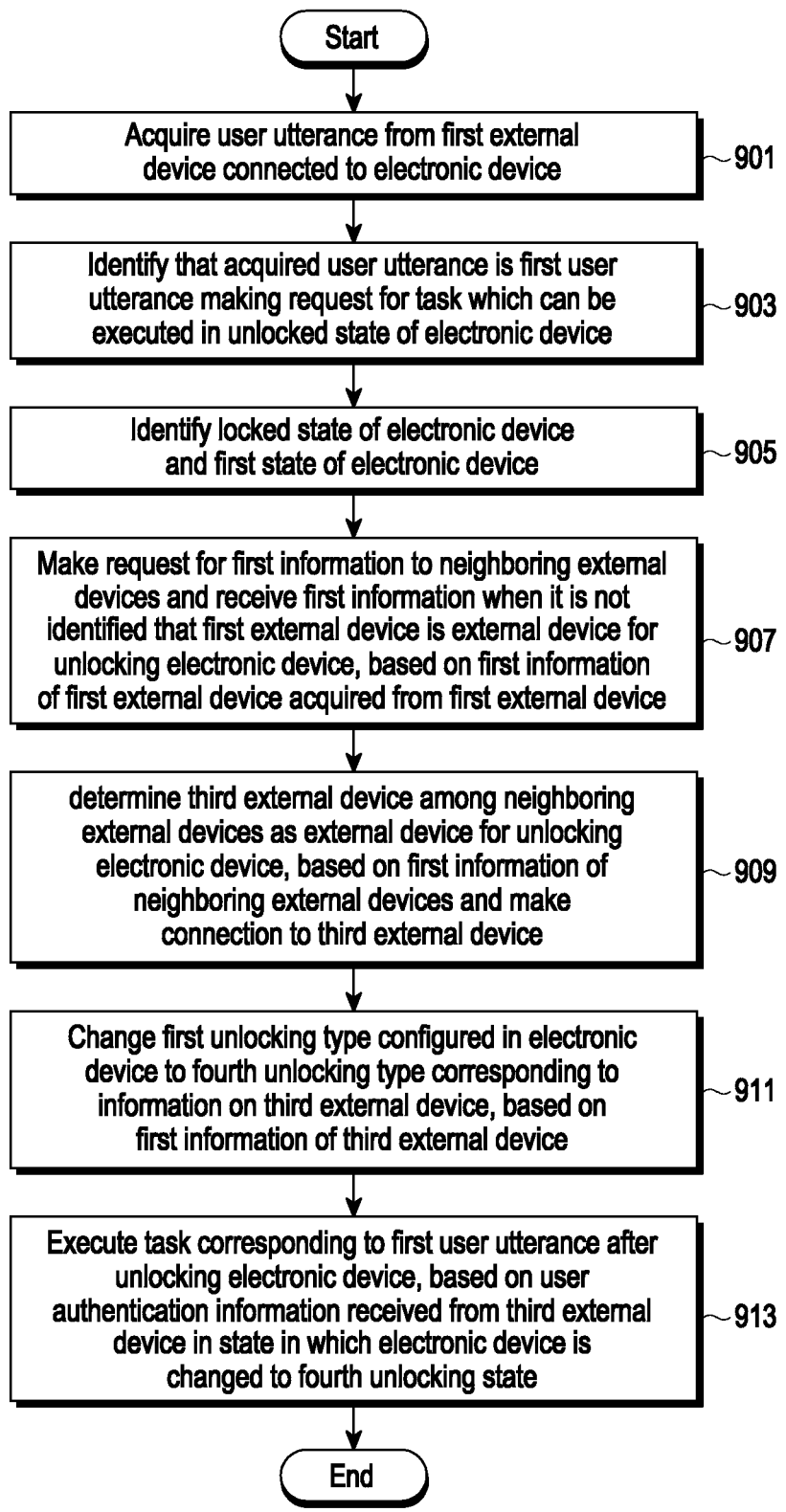
FIG. 9 is a flowchart illustrating an operation in which an electronic device is unlocked using an external device according to various embodiments.

FIG. 9 is a flowchart illustrating an operation in which an electronic device is unlocked using an external device according to various embodiments. Operations for unlocking the electronic device using the external device may include operations 901 to 913. According to an embodiment, at least one of operations 901 to 913 may be omitted, orders of some operations may be changed, or other operations may be added. The operations for unlocking the electronic device using the external device may be performed by the user terminal 100 of FIG. 1, the processor 160 of FIG. 1, the electronic device 401 of FIG. 4, the processor 420 of FIG. 4, the electronic device 601 of FIG. 6, or the processor 620 of FIG. 6.

In operation 901, the electronic device 601 may acquire a user utterance from a first external device connected through a communication module (for example, the communication module 690 of FIG. 6).

According to an embodiment, the electronic device 601 may acquire the user utterance from the first external device having short-range wireless communication through the communication module 690.

In operation 903, the electronic device 601 may identify the user utterance acquired from the first external device as a first user utterance making a request for a task which can be executed in an unlocked state of the electronic device.

According to an embodiment, when the user utterance acquired from the first external device is a user utterance making a request for performing a task related to personal information (for example, schedule information or address book information), the electronic device 601 may identify the user utterance as the first user utterance making the request for the task which can be executed in the unlocked state of the electronic device.

According to an embodiment, the electronic device 601 may identify whether the first user utterance includes a wake-up utterance which can call a virtual assistant for a voice recognition service.

In operation 905, the electronic device 601 may identify whether the electronic device is locked and the electronic device is in a first state.

According to an embodiment, the electronic device 601 may identify whether the electronic device is currently locked. The electronic device 601 may identify the first state of the electronic device in which the user does not hold the electronic device 601 on the basis of sensor information collected through a sensor module (for example, the sensor module 676 of FIG. 6). For example, the electronic device 601 may identify the first state in which the electronic device 601 is put in a bag or a pocket and thus the user is not holding the electronic device 601 on the basis of sensor information collected through a luminance sensor included in the sensor module. For example, the electronic device 601 may identify the first state in which the user is driving or cooking and thus is not holding the electronic device 601 on the basis of signal strength information between the electronic device 601 and the first external device worn on the user or sensor information collected through a proximity sensor or a grip sensor included in the sensor module.

In operation 907, when it is not identified that the first external device is the external device for unlocking the electronic device based on the first information of the first external device acquired from the first external device, the electronic device 601 may receive the first information by making a request for the first information to neighboring external devices.

According to an embodiment, when it is identified that the first external devices is not registered in the table for determining the unlocking type of the external device stored in a memory (for example, the memory 640 of FIG. 6) based on the first information of the first external device, the electronic device 601 may determine that the first external device cannot be used as the external device for unlocking the electronic device.

According to an embodiment, the electronic device 601 may make a request for the first information to neighboring external devices having no short-range wireless communication through a BLE communication module included in the communication module.

In operation 909, the electronic device 601 may determine the third external device among neighboring devices as the external device for unlocking the electronic device based on the first information of the neighboring external devices.

According to an embodiment, the electronic device 601 may determine the third external device registered in the table for determining the unlocking type of the external device stored in the memory among the neighboring devices as the external device for unlocking the electronic device based on the first information of the neighboring external devices.

According to an embodiment, the electronic device 601 may establish the short-range wireless communication connection with the third external device determined as the external device for unlocking the electronic device among the neighboring devices through the communication module.

In operation 911, the electronic device 601 may change the first unlocking type configured in the electronic device to the fourth unlocking type in which the electronic device can be unlocked using the third external device on the basis of the first information of the third external device.

According to an embodiment, the electronic device 601 may determine the fourth unlocking type, the user authentication information type, the user authentication information for unlocking, and/or the UI type for informing of unlocking of the electronic device using the third external device, which are stored while being associated with the type and the ID of the third external device, in the table for determining the unlocking type of the external device in the memory on the basis of the type and the ID of the third external device included in the first information of the third external device.

In operation 913, the electronic device 601 may execute the task corresponding to the first user utterance after unlocking the electronic device on the basis of the user authentication information received from the third external device in the state in which the change to the fourth unlocking type is made.

According to an embodiment, the electronic device 601 may compare the user authentication information for unlocking stored in the table for determining the unlocking type of the external device in the memory with the user authentication information received from the third external device, unlock the electronic device when the comparison result matches, and then execute the task corresponding to the first user utterance in the state in which the change to the fourth unlocking type in which the electronic device can be unlocked using the third external device is made.

Figure 10:
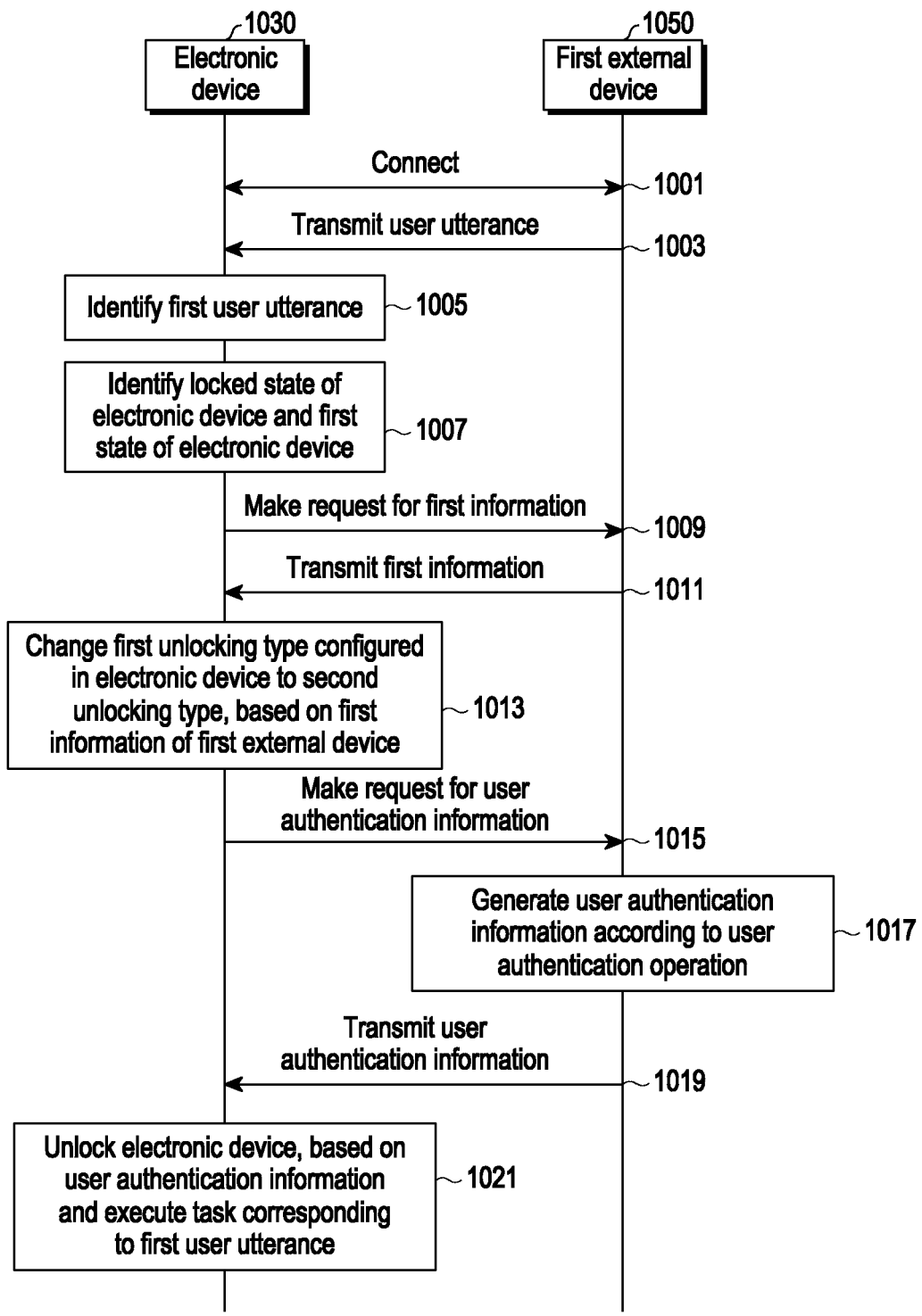
FIG. 10 is a flowchart illustrating an operation between an electronic device and an external device for unlocking the electronic device according to various embodiments.

FIG. 10 is a flowchart illustrating an operation between an electronic device and an external device for unlocking the electronic device according to various embodiments. Operations between the electronic device and the external device for unlocking the electronic device may include operations 1001 to 1021. According to an embodiment, at least one of operations 1001 to 1021 may be omitted, orders of some operations may be changed, or other operations may be added.

In operation 1001, an electronic device 1030 (for example, the user terminal 100 of FIG. 1, the electronic device 401 of FIG. 4, or the electronic device 601 of FIG. 6) and a first external device 1050 (for example, the first external device 511 of FIG. 5) may establish the short-range communication connection therebetween.

In operation 1003, the first external device 1050 may transmit a user utterance input through a microphone included in the first external device to the electronic device 1030.

In operation 1005, the electronic device 1030 may identify the user utterance acquired from the first external device 1050 as a first user utterance.

According to an embodiment, when the user utterance acquired from the first external device 1050 includes a wake-up utterance which can call a virtual assistant for a voice recognition service and includes an utterance making a request for a task which can be executed in an unlocked state of the electronic device, the electronic device 1030 may identify the user utterance as the first user utterance.

In operation 1007, the electronic device 1030 may identify a locked state of the electronic device and a first state of the electronic device.

According to an embodiment, the electronic device 1030 may identify whether the electronic device is locked and identify the first state of the electronic device in which the user is not holding the electronic device 1030 based on sensor information collected through a sensor module (for example, the sensor module 676 of FIG. 6).

The electronic device 1030 may make a request for the first information to the first external device 1050 in operation 1009, and the first external device 1050 may transmit the first information including a type and an ID of the first external device to the electronic device 1030 in operation 1011.

According to an embodiment, the electronic device 1030 may acquire the first information of the first external device in connection information of the first external device received from the first external device 1050 in order to establish the short-range wireless communication connection between the electronic device and the first external device.

According to an embodiment, the electronic device 1030 may acquire the first information of the first external device in user utterance information including the user utterance received from the first external device in operation 1003.

In operation 1013, the electronic device 1030 may change the first unlocking type configured in the electronic device to the second unlocking type in which the electronic device can be unlocked using the first external device 1050 based on the first information of the first external device.

According to an embodiment, the electronic device 1030 may determine the second unlocking type, the user authentication information type, the user authentication information for unlocking, and/or the UI type for informing of unlocking of the electronic device using the first external device, which are stored while being associated with the type and the ID of the first external device, in the table for determining the unlocking type of the external device in the memory (for example, the memory 640 of FIG. 6) based on the type and ID of the first external device included in the first information of the first external device.

According to an embodiment, when the unlocking type configured in the electronic device 1030 matches the unlocking type in which the electronic device can be unlocked using the first external device 1050, the electronic device 1030 may maintain the unlocking type configured in the electronic device 1030 without any change.

For example, when the unlocked type configured in the electronic device 1030 matches the unlocking type corresponding to a password unlocking type in which the electronic device can be unlocked using the first external device 1050, the password unlocking type configured in the electronic device 1030 may be maintained.

In operation 1015, the electronic device 1030 may make a request for user authentication information to the first external device 1050.

In operation 1017, the first external device 1050 may generate user authentication information according to a user authentication operation.

According to an embodiment, the first external device 1050 may make a request for performing the user authentication operation using the first external device to the user according to the request for the user authentication information received from the electronic device 1030.

For example, when the first external device is earphones, a request for performing the user authentication operation such as "Say the password" may be made.

According to an embodiment, when the user completes the user authentication operation using the first external device, the first external device 1050 may generate user authentication information according to the user authentication operation.

In operation 1019, the first external device 1050 may transmit the user authentication information to the electronic device 1030.

In operation 1021, the electronic device 1030 may unlock the electronic device based on the user authentication information and execute the task corresponding to the first user utterance.

According to an embodiment, in the state in which the change to the second unlocking type is made, the electronic device 1030 may compare the user authentication information for unlocking stored in the table for determining the unlocking type of the external device in the memory with the user authentication information received from the first external device, unlock the electronic device when the comparison result matches, and then execute the task corresponding to the first user utterance.

Figure 11:
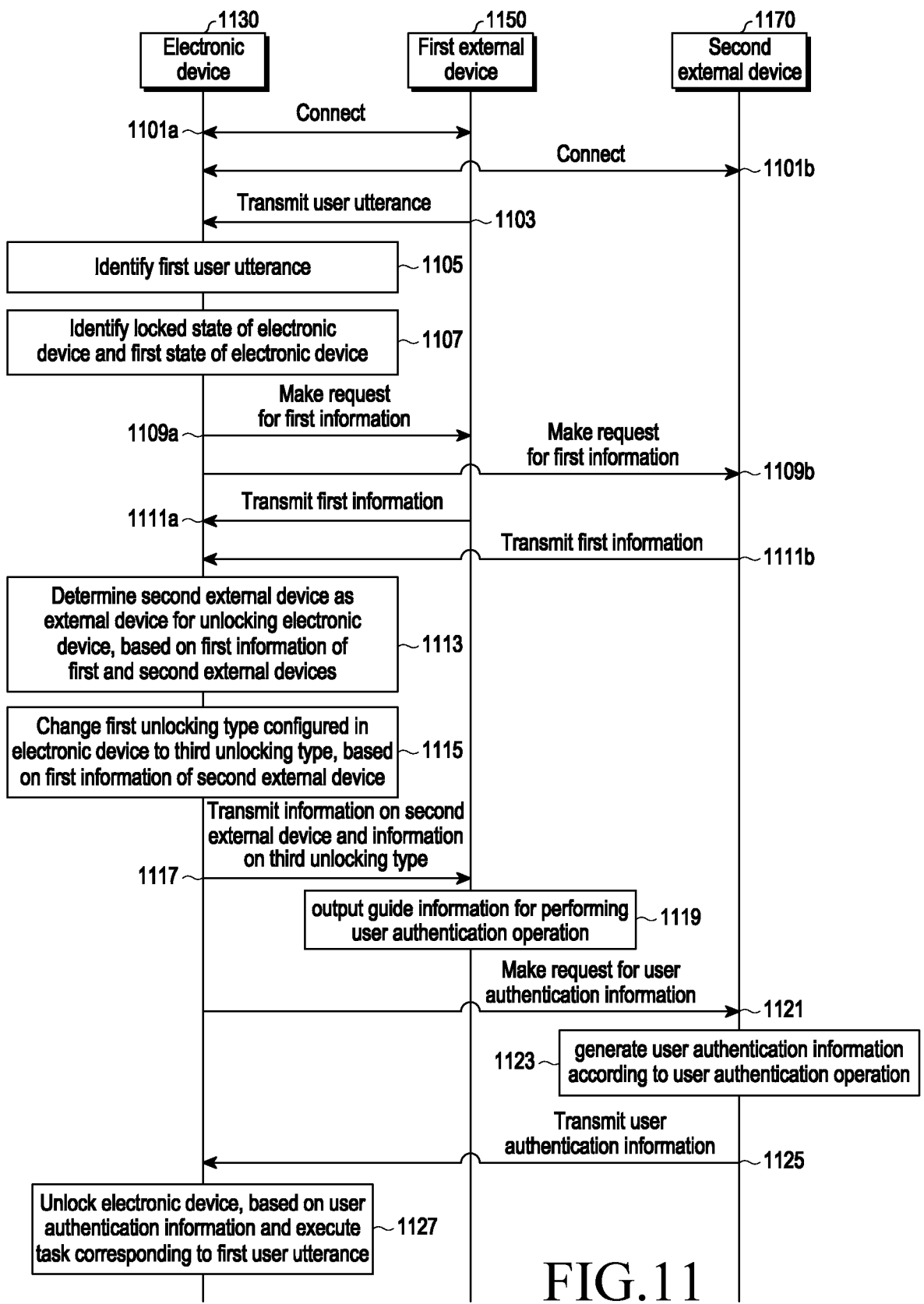
FIG. 11 is a flowchart illustrating an operation between an electronic device and an external device for unlocking the electronic device according to various embodiments.

FIG. 11 is a flowchart illustrating an operation between an electronic device and an external device for unlocking the electronic device according to various embodiments. Operations between the electronic device and the external device for unlocking the electronic device may include operations 1101a to 1127. According to an embodiment, at least one of operations 1101a to 1127 may be omitted, orders of some operations may be changed, or another operation may be added.

In operation 1101a, an electronic device 1130 (for example, the user terminal 100 of FIG. 1, the electronic device 401 of FIG. 4, or the electronic device 601 of FIG. 6) and a first external device 1150 (for example, the first external device 511 of FIG. 5) may establish the short-range communication connection therebetween.

In operation 1101b, the electronic device 1130 (for example, the user terminal 100 of FIG. 1, the electronic device 401 of FIG. 4, or the electronic device 601 of FIG. 6) and a second external device 1170 (for example, the second external device 513 of FIG. 5) may establish the short-range communication connection therebetween.

In operation 1103, the first external device 1150 may transmit a user utterance input through a microphone included in the first external device to the electronic device 1130.

In operation 1105, the electronic device 1130 may identify the user utterance acquired from the first external device 1150 as a first user utterance.

According to an embodiment, when the user utterance acquired from the first external device 1150 includes a wake-up utterance which can call a virtual assistant for a voice recognition service and includes an utterance making a request for a task which can be executed in an unlocked state of the electronic device, the electronic device 1130 may identify the user utterance as the first user utterance.

In operation 1107, the electronic device 1130 may identify a locked state of the electronic device and a first state of the electronic device.

According to an embodiment, the electronic device 1130 may identify whether the electronic device is locked and identify the first state of the electronic device in which the user is not holding the electronic device 1130 based on sensor information collected through a sensor module (for example, the sensor module 676 of FIG. 6).

In operation 1109a, the electronic device 1130 may make a request for the first information to the first external device 1150.

In operation 1111a, the first external device 1150 may transmit the first information including a type and an ID of the first external device to the electronic device 1130.

In operation 1109b, the electronic device 1130 may make a request for the first information to the second external device 1170.

In operation 1111, the second external device 1170 may transmit the first information including a type and an ID of the second external device to the electronic device 1130.

According to an embodiment, the electronic device 1130 may acquire the first information of the first external device in connection information received from the first external device 1150 in order to establish the short-range wireless communication connection between the electronic device and the first external device.

According to an embodiment, the electronic device 1130 may acquire the first information of the second external device in connection information received from the second external device 1170 in order to establish the short-range wireless communication connection between the electronic device and the second external device.

According to an embodiment, the electronic device 1130 may acquire the first information of the first external device 1150 in user utterance information including the user utterance received from the first external device 1150 in operation 1103.

In operation 1113, the electronic device 1130 may determine the second external device as the external device for unlocking the electronic device based on the first information of each of the first external device 1150 and the second external device 1170.

According to an embodiment, the electronic device 1130 may determine the second external device registered in the table for determining the unlocking type of the external device stored in a memory (for example, the memory 640 of FIG. 6) as the external device for unlocking the electronic device based on the first information of each of the first external device 1150 and the second external device 1170.

In operation 1115, the electronic device 1130 may change the first unlocking type configured in the electronic device to the third unlocking type in which the electronic device can be unlocked using the second external device based on the first information of the second external device.

According to an embodiment, the electronic device 1130 may determine the third unlocking type, the user authentication information type, the user authentication information for unlocking, and/or the UI type for informing of unlocking of the electronic device using the second external device, which are stored while being associated with the type and the ID of the second external device, in the table for determining the unlocking type of the external device in the memory, based on the type and the ID of the second external device included in the first information of the second external device.

According to an embodiment, when the unlocking type configured in the electronic device 1130 matches the unlocking type in which the electronic device can be unlocked using the second external device 1170, the electronic device 1130 may maintain the unlocking type configured in the electronic device 1130 without any change.

In operation 1117, the electronic device 1130 may transmit information on the second external device and information on the third unlocking type to the first external device 1150.

According to an embodiment, the electronic device 1130 may transmit the information on the second external device and the information on the third unlocking type to the first external device 1150 in order to instruct the user to perform the user authentication operation for unlocking the electronic device using the second external device through the first external device 1150 acquiring the first user utterance.

In operation 1119, the first external device 1150 may output guide information for performing the user authentication operation.

According to an embodiment, the first external device 1150 may output the guide information to allow the user to perform the user authentication operation based on the information on the second external device and the information on the third unlocking type received from the electronic device 1130. For example, when the first external device is earphones and the second external device is a watch phone, the first external device may output a message of "Input the password into the watch phone" through a speaker included in the first external device.

In operation 1121, the electronic device 1130 may make a request for user authentication information to the second external device 1170.

In operation 1123, the second external device 1170 may generate user authentication information according to a user authentication operation.

According to an embodiment, the second external device 1170 may make a request for performing the user authentication operation using the second external device to the user according to the request for the user authentication information received from the electronic device 1130.

For example, when the second external device is a watch phone, a screen which awaits the input of the password may be displayed on a display included in the watch phone along with the message of "Input the password".

According to an embodiment, when the user completes the user authentication operation using the second external device, the second external device 1170 may generate user authentication information according to the user authentication operation.

In operation 1125, the second external device 1170 may transmit the user authentication information to the electronic device 1130.

In operation 1127, the electronic device 1130 may unlock the electronic device based on the user authentication information and execute the task corresponding to the first user utterance.

According to an embodiment, in the state in which the change to the third unlocking type is made, the electronic device 1130 may compare the user authentication information for unlocking stored in the table for determining the unlocking type of the external device in the memory with the user authentication information received from the second external device. The electronic device may unlock the electronic device when the comparison result matches, and then execute the task corresponding to the first user utterance.

Figure 12:
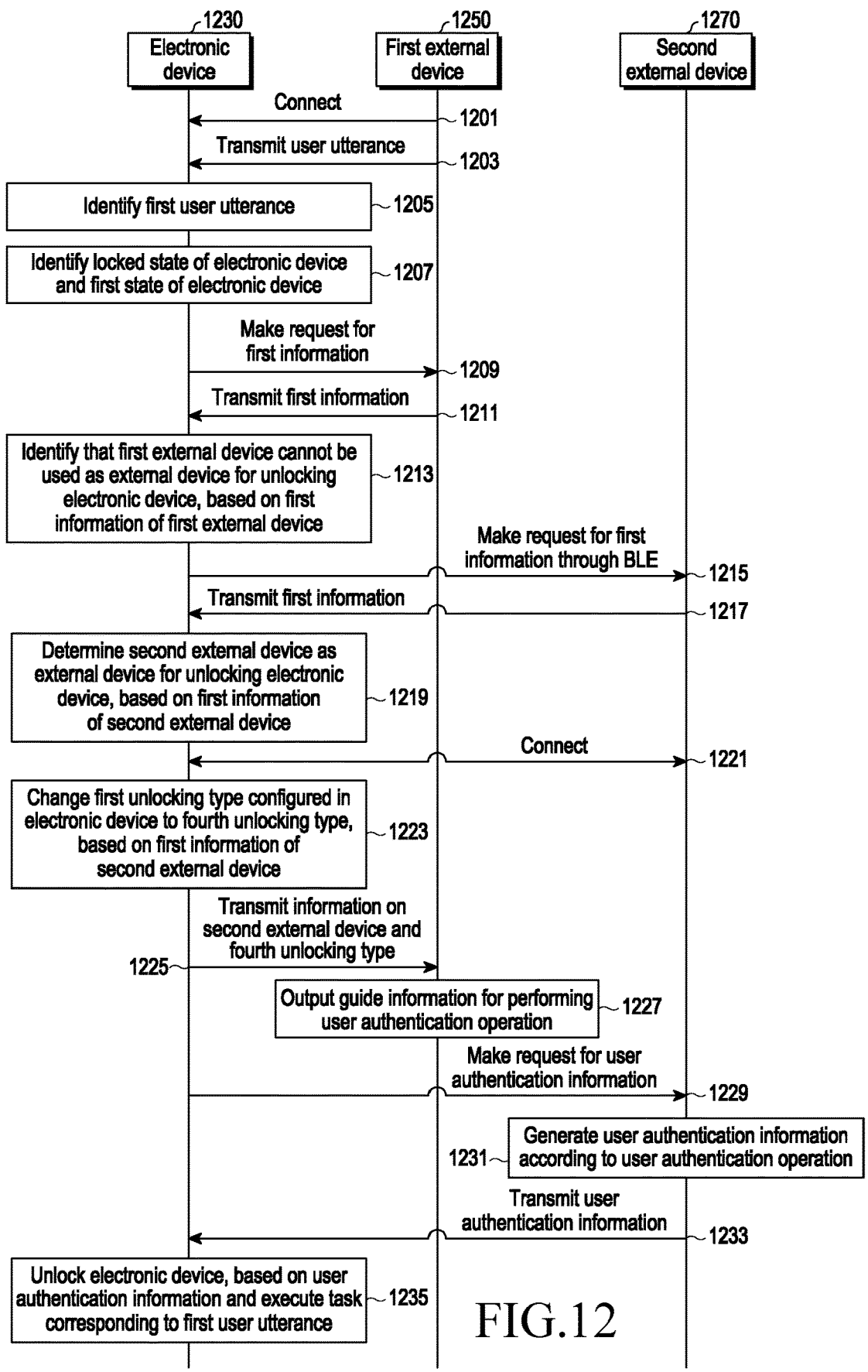
FIG. 12 is a flowchart illustrating an operation between an electronic device and an external device for unlocking the electronic device according to various embodiments.

FIG. 12 is a flowchart illustrating an operation between an electronic device and an external device for unlocking the electronic device according to various embodiments. Operations between the electronic device and the external device for unlocking the electronic device may include operations 1201 to 1235. According to an embodiment, at least one of operations 1201 to 1235 may be omitted, orders of some operations may be changed, or other operations may be added.

In operation 1201, an electronic device 1230 (for example, the user terminal 100 of FIG. 1, the electronic device 401 of FIG. 4, or the electronic device 601 of FIG. 6) and a first external device 1250 (for example, the first external device 511 of FIG. 5) may establish the short-range wireless communication connection.

In operation 1203, the first external device 1250 may transmit a user utterance input through a microphone included in the first external device to the electronic device 1230.

In operation 1205, the electronic device 1230 may identify the user utterance acquired from the first external device 1250 as a first user utterance.

According to an embodiment, when the user utterance acquired from the first external device 1250 includes a wake-up utterance which can call a virtual assistant for a voice recognition service and includes an utterance making a request for a task which can be executed in an unlocked state of the electronic device, the electronic device 1230 may identify the user utterance as the first user utterance.

In operation 1207, the electronic device 1230 may identify a locked state of the electronic device and a first state of the electronic device.

According to an embodiment, the electronic device 1230 may identify whether the electronic device is locked and identify the first state of the electronic device in which the user is not holding the electronic device 1230 based on sensor information collected through a sensor module (for example, the sensor module 676 of FIG. 6).

In operation 1209, the electronic device 1230 may make a request for the first information to the first external device 1250.

In operation 1211, the first external device 1250 may transmit the first information including a type and an ID of the first external device to the electronic device 1230.

According to an embodiment, the electronic device 1230 may acquire the first information of the first external device in connection information received from the first external device 1250 in order to establish the short-range wireless communication connection between the electronic device and the first external device.

According to an embodiment, the electronic device 1230 may acquire the first information of the first external device in user utterance information including the user utterance received from the first external device 1250 in operation 1203.

In operation 1213, the electronic device 1230 may identify that the first external device cannot be used as the external device for unlocking the electronic device based on the first information of the first external device 1250.

According to an embodiment, the electronic device 1230 may identify that the first external device 1250 is not registered in the table for determining the unlocking type of the external device stored in a memory (for example, the memory 640 of FIG. 6) and determine that the first external device 1250 cannot be used as the external device for unlocking the electronic device.

In operation 1215, the electronic device 1230 may make a request for the first information to the second external device 1270.

In operation 1217, the second external device 1270 may transmit the first information of the second external device to the electronic device 1230.

According to an embodiment, the electronic device 1230 may make a request for the first information to the second external device 1270 having no short-range wireless communication connection through a BLE communication module included in a communication module (for example, the communication module 690 of FIG. 4) and receive second information of the second external device 1270 from the second external device.

In operation 1219, the electronic device 1230 may determine the second external device as the external device for unlocking the electronic device based on the first information of the second external device 1270.

According to an embodiment, the electronic device 1230 may identify that the second external device 1270 is registered in the table for determining the unlocking type of the external device stored in the memory and determine the second external device 1270 as the external device for unlocking the electronic device.

In operation 1221, the electronic device 1230 may establish the short-range wireless communication connection with the second external device 1270.

According to an embodiment, the electronic device 1230 may make a request for the short-range wireless communication connection to the second external device 1270 and establish the short-range communication connection with the second external device 1270.

In operation 1223, the electronic device 1230 may change the first unlocking type configured in the electronic device to the fourth unlocking type in which the electronic device can be unlocked using the second external device based on the first information of the second external device.

According to an embodiment, the electronic device 1230 may determine the fourth unlocking type, the user authentication information type, the user authentication information for unlocking, and/or the UI type for informing of unlocking of the electronic device using the second external device, which are stored while being associated with the type and the ID of the second external device, in the table for determining the unlocking type of the external device in the memory, based on the type and the ID of the second external device included in the first information of the second external device According to an embodiment, when the unlocking type configured in the electronic device 1230 matches the unlocking type in which the electronic device can be unlocked using the second external device 1270, the electronic device 1230 may maintain the unlocking type configured in the electronic device 1230 without any change.

In operation 1225, the electronic device 1230 may transmit information on the second external device 1270 and information on the fourth unlocking type to the first external device 1250.

According to an embodiment, the electronic device 1230 may transmit the information on the second external device 1270 and the information on the fourth unlocking type to the first external device 1250 in order to instruct the user to perform the user authentication operation for unlocking the electronic device using the second external device 1270 through the first external device 1250 acquiring the first user utterance.

In operation 1227, the first external device 1250 may output guide information for performing the user authentication operation.

According to an embodiment, the first external device 1250 may output the guide information to allow the user to perform the user authentication operation based on the information on the second external device and the information on the fourth unlocking type received from the electronic device 1130. For example, when the first external device 1250 is earphones and the second external device 1270 is a tablet, the first external device 1250 may output a message of "Authenticate your fingerprint in the tablet" through a speaker included in the first external device 1250.

In operation 1229, the electronic device 1230 may make a request for user authentication information to the second external device 1270.

In operation 1231, the second external device 1270 may generate user authentication information according to a user authentication operation.

According to an embodiment, the second external device 1270 may make a request for performing the user authentication operation using the second external device to the user according to the request for the user authentication information received from the electronic device 1230.

For example, when the second external device is a tablet, a screen that awaits fingerprint authentication may be displayed on a display included in the tablet along with the message of "Authenticate your fingerprint".

According to an embodiment, when the user completes the user authentication operation using the second external device, the second external device 1270 may generate user authentication information according to the user authentication operation.

In operation 1233, the second external device 1270 may transmit the user authentication information to the electronic device 1230.

In operation 1235, the electronic device 1230 may unlock the electronic device based on the user authentication information and executes the task corresponding to the first user utterance.

According to an embodiment, in a state in which the change to the fourth unlocking type is made, the electronic device 1230 may compare the user authentication information for unlocking, stored in the table for determining the unlocking type of the external device in the memory, with the user authentication information received from the second external device 1270. The electronic device may unlock the electronic device when the comparison result matches, and then execute the task corresponding to the first user utterance.

Figure 13A:
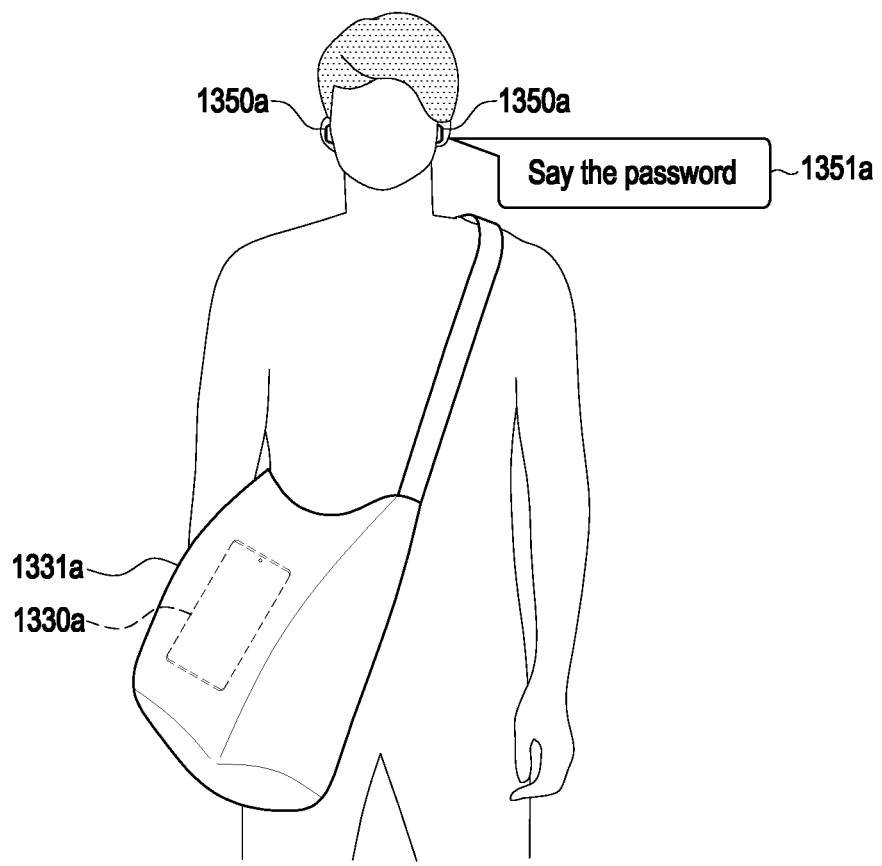
FIGS. 13A-13E are diagrams illustrating operations for releasing a locked state of an electronic device using an external device by the electronic device, according to various embodiments.

FIG. 13A illustrates an operation for releasing a locked state of an electronic device using an external device by the electronic device, according to various embodiments.

Referring to FIG. 13A, when an electronic device 1330*a* (for example, the user terminal 100 of FIG. 1, the electronic device 401 of FIG. 4, or the electronic device 601 of FIG. 6) acquires a first user utterance making a request for a task, which can be executed in an unlocked state of the electronic device, from earphones 1350*a*, in a state in which the electronic device 1330*a* establishes a short-range communication connection with the earphones 1350*a* (for example, the first external device 511 of FIG. 5) worn on a user's ears, it may be identified that the electronic device 1330*a* is in a locked state and in a first state in which the electronic device 1330*a* in a bag 1331*a*. The electronic device 1330*a* may identify that the earphones 1350*a* are registered in the table for determining the unlocking type of the external device, stored in a memory of the electronic device 1330*a* based on first information (for example, a type and an ID of the external device) of the earphones 1350*a*. The electronic device 1330*a* may change the first unlocking type (for example, a pattern unlocking type) configured in the electronic device 1330*a* to the second unlocking type (for example, a password unlocking type) through which the electronic device can be unlocked using the earphones 1350*a*. When the electronic device 1330*a* makes a request for user authentication information to the earphones 1350*a*, the earphones 1350*a* may output a message 1351*a* of "Say the password" through a speaker, and allow the user to perform a user authentication operation. When the earphones 1350*a* generate the password input through a user's voice as user authentication information and transmit the same to the electronic device 1330*a*, the electronic device 1330*a* may unlock the electronic device 1330*a* based on the user authentication information (for example, password) received from the earphones 1350*a* and then perform the task corresponding to the first user utterance.

Figure 13B:
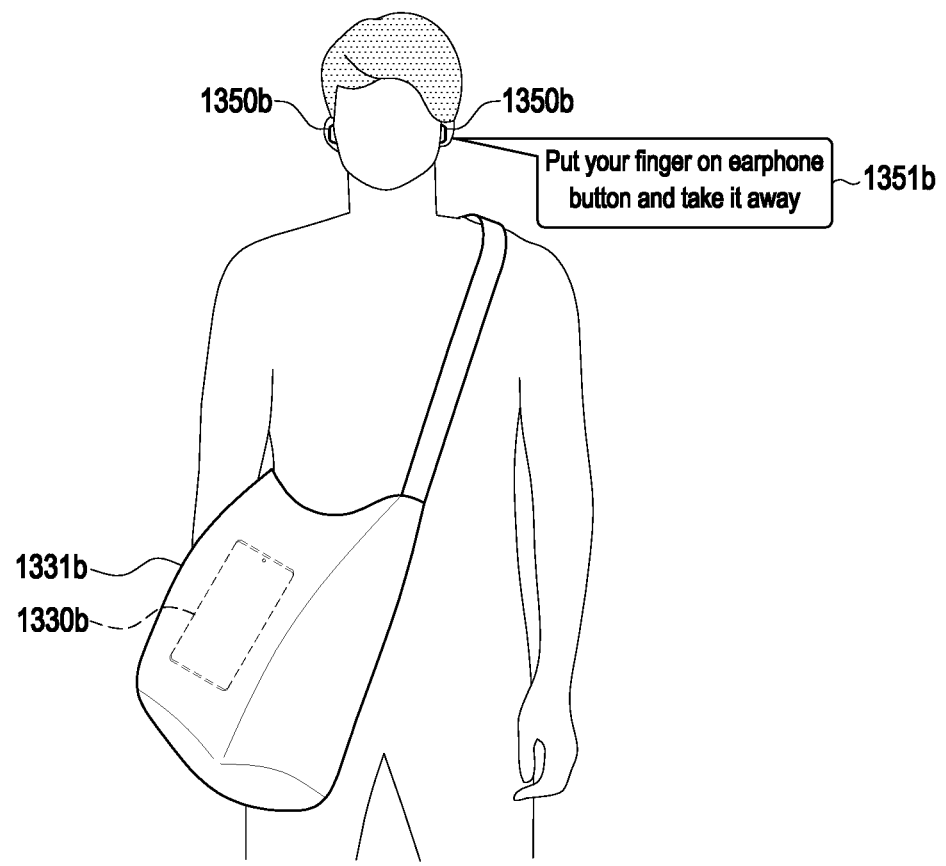

Referring to FIG. 13B, when an electronic device 1330*b* (for example, the user terminal 100 of FIG. 1, the electronic device 401 of FIG. 4, or the electronic device 601 of FIG. 6) acquires a first user utterance making a request for a task, which can be executed in an unlocked state of the electronic device, from earphones 1350*b* in a state in which the electronic device 1330*b* establishes a short-range communication connection with the earphones 1350*b* (for example, the first external device 511 of FIG. 5) worn on a user's ears, it may be identified that the electronic device 1330*b* is in a locked state and in a first state in which the electronic device 1330*b* is in a bag 1331*b*.

The electronic device 1330*b* may identify registration of the earphones 1350*b* in the table for determining the unlocking type of the external device, stored in a memory of the electronic device 1330*b* based on first information (for example, a type and an ID of the external device) of the earphones 1350*b*. The electronic device 1330*b* may change the first unlocking type (for example, a pattern unlocking type) configured in the electronic device 1330*b* to the second unlocking type (for example, a fingerprint unlocking type) in which the electronic device can be unlocked using the earphones 1350*b*. When the electronic device 1330*b* makes a request for user authentication information to the earphones 1350*b*, the earphones 1350*b* may output a message 1351*b* of "Put your finger on the earphone button and then take it away" through a speaker, and allow the user to perform the user authentication operation. When the earphones 1350*b* generate fingerprint information input through a fingerprint of the user and transmit the same to the electronic device 1330*b*, the electronic device 1330*b* may unlock the electronic device 1330*b* based on the user authentication information (for example, fingerprint information) received from the earphones 1350*b* and then execute the task corresponding to the first user utterance.

Figure 13C:
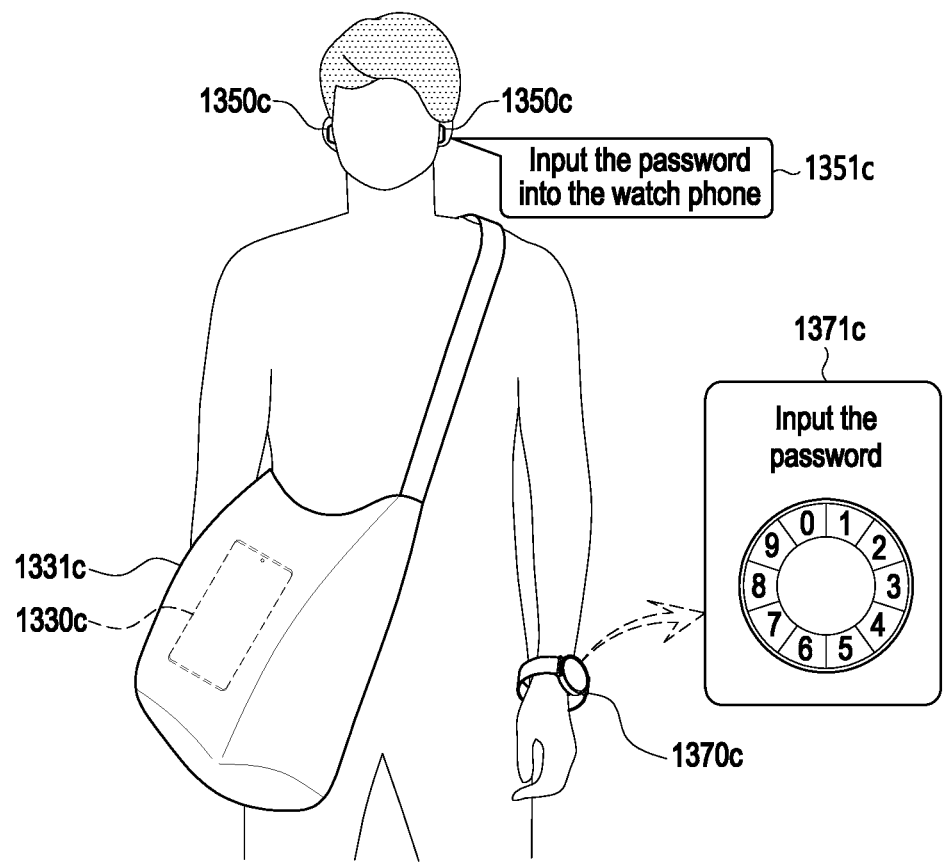

Referring to FIG. 13C, when an electronic device 1330*c* (for example, the user terminal 100 of FIG. 1, the electronic device 401 of FIG. 4, or the electronic device 601 of FIG. 6) acquires a first user utterance making a request for a task that can be executed in an unlocked state of the electronic device from earphones 1350*c*, in a state in which the electronic device 1330*c* establishes a short-range communication connection with each of the earphones 1350*c* (for example, the first external device 511 of FIG. 5) worn on a user's ears and a watch phone 1370*c* (for example, the second external device 513 of FIG. 5) worn on a user's wrist, it may be identified that the electronic device 1330*c* is in a locked state and in a first state in which the electronic device 1330*c* is in a bag 1331*c*. The electronic device 1330*c* may identify that the watch phone 1370*c* is registered in the table for determining the unlocking type of the external device, stored in a memory of the electronic device 1330*c* based on first information (for example, a type and an ID of the external device) of the earphones 1350*c* and first information (for example, a type and an ID of the external device) of the watch phone 1370*c*. The electronic device 1330*c* may change the first unlocking type (for example, a pattern unlocking type) configured in the electronic device 1330*c* to the third unlocking type (for example, a password unlocking type), through which the electronic device can be unlocked using the watch phone 1370*c*. The electronic device 1330*c* may transmit the first information of the watch phone and information on the third unlocking type to the earphones 1350*c*, and output a message 1351*c* of "Input the password into the watch phone" through a speaker of the earphones 1350*c*. When the electronic device 1330*c* makes a request for user authentication information to the watch phone 1370*c*, the watch phone 1370*c* may display a screen that awaits the input of the password by the user through a display 1371*c* along with the message of "Input the password". The screen which awaits the input of the password may correspond to a screen displaying a number keypad through which numbers corresponding to the password can be received. When the watch phone 1370*c* transmits the password input by the user to the electronic device 1330*c* as the user authentication information, the electronic device 1330*c* may unlock the electronic device and then execute the task corresponding to the first user utterance.

Figure 13D:
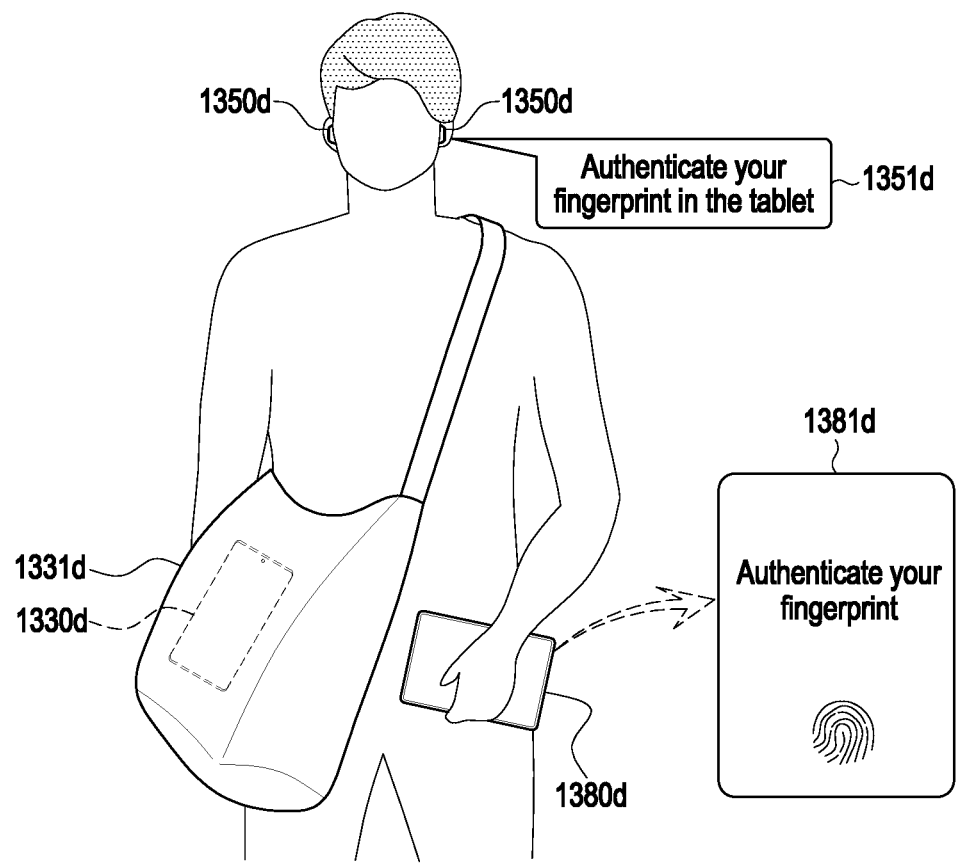

Referring to FIG. 13D, when an electronic device 1330*d* (for example, the user terminal 100 of FIG. 1, the electronic device 401 of FIG. 4, or the electronic device 601 of FIG. 6) acquires a first user utterance making a request for a task that can be executed in an unlocked state of the electronic device from earphones 1350*d*, in a state in which the electronic device 1330*d* establishes a short-range communication connection with each of the earphones 1350*d* (for example, the first external device 511 of FIG. 5) worn on a user's ears and a tablet 1380*d* (for example, the third external device 515 of FIG. 5) held by a user's hand, it may be identified that the electronic device 1330*d* is in a locked state and in a first state in which the electronic device 1330*d* is in a bag 1331*d*. The electronic device 1330*d* may identify that the tablet 1380*d* is registered in the table for determining the unlocking type of the external device, stored in a memory of the electronic device 1330*d* based on first information (for example, a type and an ID of the external device) of the earphones 1350*d* and first information (for example, type and an ID of the external device) of the tablet 1380*d*. The electronic device 1330*d* may change the first unlocking type (for example, a pattern unlocking type) configured in the electronic device 1330*d* to the third unlocking type (for example, a fingerprint unlocking type) in which the electronic device can be unlocked using the tablet 1380*d*. The electronic device 1330*d* may transmit the first information of the tablet and information on the third unlocking type to the earphones 1350*d*, and output a message 1351*d* of "Authenticate your fingerprint in the tablet" through a speaker of the earphones 1350*d*. When the electronic device 1330*d* makes a request for user authentication information to the tablet 1380*d*, the tablet 1380*d* may display a screen that awaits the input of fingerprint authentication by the user through a display 1318*d* along with the message of "Authenticate your fingerprint". When the tablet 1380*d* generates fingerprint information authenticated by the user as the user authentication information and transmits the same to the electronic device 1330*d*, the electronic device 1330*d* may unlock the electronic device and execute the task corresponding to the first user utterance.

Figure 13E:
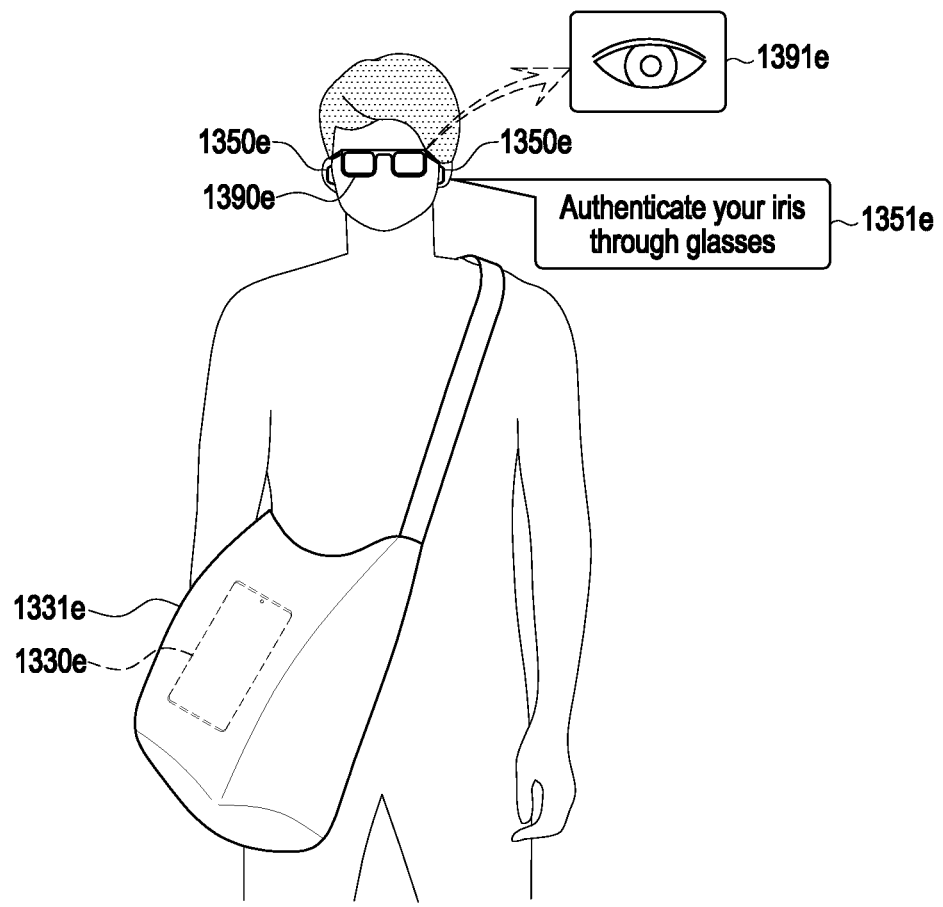

Referring to FIG. 13E, when an electronic device 1330*e* (for example, the user terminal 100 of FIG. 1, the electronic device 401 of FIG. 4, or the electronic device 601 of FIG. 6) acquires a first user utterance making a request for a task, which can be executed in an unlocked state of the electronic device, from earphones 1350*e*, in a state in which the electronic device 1330*e* establishes a short-range communication connection with each of the earphones 1350*e* (for example, the first external device 511 of FIG. 5) worn on a user's ears and glasses 1390*e* (for example, the fourth external device 517 of FIG. 5) worn on a user's face, it may be identified that the electronic device 1330*e* is in a locked state and in a first state in which the electronic device 1330*e* is in a bag 1331*e*. The electronic device 1330*e* may identify that the glasses 1390*e* are registered in the table for determining the unlocking type of the external device, stored in a memory of the electronic device 1330*e* based on first information (for example, a type and an ID of the external device) of the earphones 1350*e* and first information (for example, a type and an ID of the external device) of the glasses 1390*e*. The electronic device 1330*e* may change the first unlocking type (for example, a pattern unlocking type), configured in the electronic device 1330*e*, to the third unlocking type (for example, an iris recognition unlocking type), in which the electronic device can be unlocked using the glasses 1390*e*. The electronic device 1330*e* may transmit the first information of the glasses 1390*e* and information on the third unlocking type to the earphones 1350*e*, and output a message 1351*e* of "Authenticate your iris through glasses" through a speaker of the earphones 1350*e*. When the electronic device 1330*e* makes a request for user authentication information to the glasses 1390*e*, the glasses 1390*e* may display a screen which awaits the input of iris recognition by the user through a display 1391*e*. When the glasses 1390*e* generate iris information authenticated by the user as the user authentication information and transmit the same to the electronic device 1330*e*, the electronic device 1330*e* may unlock the electronic device and then execute the task corresponding to the first user utterance.

According to various embodiments, a method of performing an authentication operation by an electronic device may include an operation of acquiring a first user utterance that requests a task executable in an unlocked state of the electronic device. When a locked state of the electronic device and a first state of the electronic device are identified, an unlocking type of the electronic device is changed to an unlocking type of an external device, based on first information of the external device. The external device is communicatively connected to the electronic device. The electronic device, which is configured with the unlocking type, is unlocked based on user authentication information acquired from the external device, and the task corresponding to the first user utterance is executed.

According to various embodiments, the method may further include an operation of identifying whether the first user utterance includes a wake-up utterance that can call a virtual assistant.

According to various embodiments, the operation of identifying the first state of the electronic device may include an operation of identifying the first state of the electronic device on the basis of sensor information collected through a sensor module of the electronic device.

According to various embodiments, the method may further include an operation of identifying the user authentication information, which can be generated in the external device, and the unlocking type of the external device, in a memory of the electronic device on the basis of the first information of the external device.

According to various embodiments, the method may further include an operation of acquiring a first user utterance making a request for a task which can be executed in an unlocked state of the electronic device from a first external device while the first external device is communicatively connected to the electronic device, operation of when a locked state of the electronic device and a first state of the electronic device are identified, changing a first unlocking type configured in the electronic device to a second unlocking type of the first external, based on first information of the first external device, and operation of unlocking the electronic device configured in the second unlocking type, based on user authentication information acquired from the first external device and then executing the task corresponding to the first user utterance.

According to various embodiments, the method may further include an operation of acquiring the first user utterance from the first external device among a plurality of external devices while the plurality of external devices are communicatively connected to the electronic device, an operation of, when the locked state of the electronic device and the first state of the electronic device are identified, determining a second external device among the plurality of external devices as an external device for unlocking the electronic device on the basis of first information acquired from each of the plurality of external devices, an operation of changing the first unlocking type configured in the electronic device to a third unlocking type of the second external device on the basis of first information of the second external device, and an operation of unlocking the electronic device configured in the third unlocking type on the basis of user authentication information acquired from the second external device and then executing the task corresponding to the first user utterance.

According to various embodiments, the method may further include an operation of transmitting the first information of the second external device determined as the and information on the third unlocking type, to the first external device, in order to inform a user of unlocking of the electronic device using the second external device through the first external device.

According to various embodiments, the method may further include an operation of, when it is identified that the first external device cannot be used as the external device for unlocking the electronic device based on the first information of the first external device, making a request for information to neighboring external devices, that are not communicatively connected to the electronic device. A third external device, among the neighboring external devices, is determined as the external device for unlocking the electronic device based on the first information acquired from the neighboring external devices, performing an operation for a connection with the third external device, an operation of changing the first unlocking type configured in the electronic device to a fourth unlocking type on the basis of first information of the third external device, and an operation of unlocking the electronic device configured in the fourth unlocking type on the basis of user authentication information acquired from the third external device communicatively connected to the electronic device and then executing the task corresponding to the first user utterance.

According to various embodiments, the method may further include an operation of identifying the user authentication information, which can be generated in the third external device, and the third unlocking type, based on the first information of the third external device.

According to various embodiments, the method may further include an operation of transmitting the first information of the third external device and information on the fourth unlocking type, to the first external device in order to inform a user of unlocking of the electronic device using the third external device through the first external device.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments of the disclosure as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the method of performing the authentication by the electronic device according to the disclosure, through a method of recognizing a user voice and analyzing an intent, in order to prevent an operation by a voice output from a media device, a voice signal corresponding to an analog signal may be received through, for example, a microphone and a voice part may be converted into computer-readable text through an automatic speech recognition (ASR) model. An intent of the user utterance may be acquired by analyzing text converted using a natural language understanding (NLU) model. The ASR model or the NLU model may be an artificial intelligence model. The intelligence model may be processed by an artificial intelligence-dedicated processor designated in a hardware structure specified for processing the artificial intelligence model. The artificial intelligence model may be made through learning. Being made through learning means that a predefined operation rule or an artificial intelligence model configured to perform a desired characteristic (or purpose) is made through learning using a plurality of pieces of learning data based on a learning algorithm. The artificial intelligence model may include a plurality of neural network layers. Each of the plurality of neural network layers has a plurality of weight values and performs a neural network operation through the operation result of a previous layer and an operation between the plurality of weight values.

Linguistic understanding is a technology for recognizing and applying/processing a human language/character and includes natural language processing, machine translation, dialogue system, question and answering, and speech recognition/synthesis.

While the disclosure has been shown and described with reference to certain embodiments thereof, it will be understood by those skilled in the art that various changes in form and detail may be made therein without departing from the spirit and scope of the disclosure as defined by the appended claims.

The invention claimed is:

1. An electronic device comprising:
   communication circuitry;
   a processor; and
   memory storing instructions that, when executed by the processor, cause the electronic device to:
   if a locked state of the electronic device and a first state of the electronic device in which a user is not holding the electronic device are identified, when a first user utterance is acquired that requests a task executable in an unlocked state of the electronic device, change an unlocking type of the electronic device to an unlocking type of an external device, based on information of the external device, the external device being communicatively connected to the electronic device through the communication circuitry,
   unlock the electronic device, which is configured with the unlocking type of the external device, based on user authentication information acquired from the external device, and
   execute the task corresponding to the first user utterance.

2. The electronic device of claim 1, wherein the instructions, when executed by the processor, cause the electronic device to:
   identify whether the first user utterance includes a wake-up utterance that can call a virtual assistant.

3. The electronic device of claim 1, further comprising a sensor module,
   wherein the instructions, when executed by the processor, cause the electronic device to:
   identify the first state of the electronic device, based on sensor information collected through the sensor module.

4. The electronic device of claim 1, wherein the instructions, when executed by the processor, cause the electronic device to:
   identify the user authentication information, which can be generated in the external device, and the unlocking type of the external device, based on the information of the external device.

5. The electronic device of claim 1, wherein the instructions, when executed by the processor, cause the electronic device to:
   if the locked state of the electronic device and the first state of the electronic device are identified when the first user utterance is acquired from a first external device among a plurality of external devices while the plurality of external devices are communicatively connected to the electronic device, identify a second external device for unlocking the electronic device among the plurality of external devices, based on information acquired from each of the plurality of external devices, and change a first unlocking type configured in the electronic device to a second unlocking type of the second external device, based on information of the second external device, and
   unlock the electronic device configured in the second unlocking type, based on user authentication information acquired from the second external device, and then execute the task corresponding to the first user utterance.

6. The electronic device of claim 5, wherein the instructions, when executed by the processor, cause the electronic device to:
   when it is identified that the first external device cannot be used for unlocking the electronic device, based on the first information of external device, make a request for information of neighboring external devices that are currently not communicatively connected to the electronic device,
   when the second external device among the neighboring external devices is identified for unlocking the electronic device, based on information acquired at least part from the neighboring external devices, perform an operation for a connection with the second external device,
   change the first unlocking type configured in the electronic device to the second unlocking type, based on the information of the second external device, and
   unlock the electronic device configured in the second unlocking type, based on user authentication information acquired from the second external device communicatively connected to the electronic device, and then execute the task corresponding to the first user utterance.

7. The electronic device of claim 6, wherein the instructions, when executed by the processor, cause the electronic device to:
   identify the user authentication information, which can be generated in the second external device, and the second unlocking type, in which the electronic device can be unlocked using the user authentication information, based on the information of the second external device.

8. A method of performing an authentication operation by an electronic device, the method comprising:
   acquiring a first user utterance that requests a task executable in an unlocked state of the electronic device;
   when a locked state of the electronic device and a first state of the electronic device in which a user is not holding the electronic device are identified, changing an unlocking type configured in the electronic device to an unlocking type of an external device, based on information of the external device, the external device being communicatively connected to the electronic device;
   unlocking the electronic device, which is configured with the unlocking type of the external device, based on user authentication information acquired from the external device; and
   executing the task corresponding to the first user utterance.

9. The method of claim 8, wherein identifying the first state of the electronic device comprises identifying the first state of the electronic device based on sensor information collected through a sensor module of the electronic device.

10. The method of claim 8, further comprising identifying the user authentication information, which can be generated in the external device, and the unlocking type of the external device, based on the information of the external device.

11. The method of claim 8, further comprising:
acquiring the first user utterance from a first external device among a plurality of external devices while the plurality of external devices are communicatively connected to the electronic device;
when the locked state of the electronic device and the first state of the electronic device are identified, identifying a second external device for unlocking the electronic device among the plurality of external devices, based on information acquired from each of the plurality of external devices;
changing a first unlocking type configured in the electronic device to a second unlocking type of the second external device, based on first information of the second external device; and
unlocking the electronic device configured in the second unlocking type, based on user authentication information acquired from the second external device and then executing the task corresponding to the first user utterance.

12. The method of claim 8, further comprising:
when it is identified that the first external device cannot be used for unlocking the electronic device, based on information of the first external device, making a request for information of neighboring external devices which are currently not communicatively connected to the electronic device;
when the second external device among the neighboring external devices is identified for unlocking the electronic device, based on information acquired at least part from the neighboring external devices, performing an operation for a connection with the second external device;
changing the first unlocking type configured in the electronic device to the second unlocking type, based on the information of the second external device; and
unlocking the electronic device configured in the second unlocking type, based on the user authentication information acquired from the second external device communicatively connected to the electronic device and then executing the task corresponding to the first user utterance.

13. The method of claim 12, further comprising identifying the user authentication information, which can be generated in the second external device, and the second unlocking type, based on the information of the second external device.

* * * * *